(12) United States Patent
Nomoto et al.

(10) Patent No.: US 12,546,362 B2
(45) Date of Patent: Feb. 10, 2026

(54) TRANSMISSION

(71) Applicant: NSK Ltd., Tokyo (JP)

(72) Inventors: Takahisa Nomoto, Fujisawa (JP); Hiroki Nishii, Fujisawa (JP); Yuki Koshiba, Fujisawa (JP); Hiroyasu Yoshioka, Fujisawa (JP); Hiroshi Katou, Fujisawa (JP)

(*) Notice: Subject to any disclaimer, the term of this patent is extended or adjusted under 35 U.S.C. 154(b) by 72 days.

(21) Appl. No.: 18/292,933

(22) PCT Filed: Jul. 26, 2022

(86) PCT No.: PCT/JP2022/028799
§ 371 (c)(1),
(2) Date: Jan. 29, 2024

(87) PCT Pub. No.: WO2023/008434
PCT Pub. Date: Feb. 2, 2023

(65) Prior Publication Data
US 2024/0328456 A1    Oct. 3, 2024

(30) Foreign Application Priority Data
Jul. 30, 2021   (JP) ................. 2021-125707

(51) Int. Cl.
*F16C 19/06* (2006.01)
*F16C 33/58* (2006.01)

(52) U.S. Cl.
CPC ........... *F16C 19/06* (2013.01); *F16C 33/585* (2013.01); *F16C 2361/61* (2013.01)

(58) Field of Classification Search
CPC ............ F16H 37/0813; F16H 57/021; F16H 2048/405; F16C 19/06; F16C 33/585; F16C 2361/61
See application file for complete search history.

(56) References Cited

U.S. PATENT DOCUMENTS

| 10,480,635 B2 * | 11/2019 | Matsuda ............... F16C 19/364 |
| 2016/0195442 A1 | 7/2016 | Saito et al. |
| 2022/0111740 A1 | 4/2022 | Inoue |

FOREIGN PATENT DOCUMENTS

| JP | 2007-145088 | 6/2007 |
| JP | 2007-247695 | 9/2007 |
| JP | 2017-003048 | 1/2017 |
| WO | 2015/033976 | 3/2015 |
| WO | 2020/202963 | 10/2020 |

OTHER PUBLICATIONS

International Search Report dated Oct. 25, 2022 for PCT/JP2022/028799.
International Preliminary Report on Patentability with Written Opinion dated Feb. 8, 2024 for PCT/JP2022/028799.

* cited by examiner

*Primary Examiner* — Huan Le
(74) *Attorney, Agent, or Firm* — SHIPWAY IP

(57) ABSTRACT

A transmission includes a first shaft unit connected to a drive shaft of a drive unit. The first shaft unit includes a first shaft having a first shaft raceway surface on an outer peripheral surface thereof, a first output gear provided on the first shaft, a first outer ring attached to a first support part, the first outer ring having a first outer ring raceway surface on an inner peripheral surface thereof, and a plurality of first rolling elements disposed between the first shaft raceway surface and the first outer ring raceway surface.

17 Claims, 18 Drawing Sheets

TRANSMISSION

CROSS-REFERENCE TO RELATED APPLICATIONS

This application is a 35 U.S.C. § 371 national phase application of PCT/JP2022/028799, filed on Jul. 26, 2022, which claims priority to Japanese Patent Application No. 2021-125707, filed on Jul. 30, 2021.

TECHNICAL FIELD

The present disclosure relates to a transmission that decelerates or accelerates a rotational speed of a drive unit.

BACKGROUND ART

For example, as described in Patent Literature 1, there is a transmission (speed reducer) that decelerates and outputs a rotational speed of a drive shaft of a drive unit. Such a transmission includes a plurality of rotation shafts provided with gears, engages the gears, and sequentially transmits the rotation of the drive shaft to the plurality of rotation shafts, thereby reducing the rotational speed. Therefore, such a transmission is provided with a plurality of bearings that rotatably support the rotation shafts with respect to a housing.

CITATION LIST

Patent Literature

Patent Literature 1: Japanese Unexamined Patent Publication No. 2017-3048

SUMMARY OF INVENTION

Technical Problem

Here, in the transmission as described above, the rotational speed of the drive shaft of the drive unit is sequentially reduced or increased by the gears. Accordingly, when a shake occurs in the rotation shaft provided with the gears, it is considered that there is a possibility of causing deterioration in rotational performance, durability, and the like.

Therefore, an object of the present disclosure is to provide a transmission capable of stably and rotatably supporting a rotation shaft.

Solution to Problem

A transmission according to a first aspect of the present disclosure includes a first shaft unit connected to a drive shaft of a drive unit, in which the first shaft unit includes: a first shaft connected to the drive shaft, the first shaft including a first shaft raceway surface on an outer peripheral surface thereof; a first output gear provided on the first shaft and configured to rotate integrally with the first shaft; a first outer ring attached to a first support part supporting the first shaft and provided so as to surround the first shaft raceway surface, the first outer ring including a first outer ring raceway surface on an inner peripheral surface thereof; and a plurality of first rolling elements disposed between the first shaft raceway surface and the first outer ring raceway surface.

In the transmission, the first shaft that is a rotation shaft connected to the drive shaft of the drive unit, is rotatably supported by the first support part via the first rolling element and the first outer ring. That is, the first shaft also functions as an inner ring of a bearing. Accordingly, in the transmission, the number of components of a mechanism that supports the first shaft can be reduced, and it is possible to prevent deterioration in support accuracy of the first shaft due to variations in component accuracy or the like. Therefore, in the transmission, the first shaft (rotation shaft) connected to the drive shaft of the drive unit can be stably and rotatably supported.

In the transmission described above, the first rolling element may be a ball, the first shaft raceway surface may be a groove extending in a circumferential direction of the outer peripheral surface of the first shaft, and the groove forming the first shaft raceway surface may have a pair of groove edge parts extending in the circumferential direction of the outer peripheral surface of the first shaft, in which the groove edge part on a side closer to the first output gear may have a diameter larger than a diameter of the other groove edge part. In this case, in the transmission, even when the first rolling element receives a load in the axial direction of the first shaft, the first rolling element can be prevented from riding on the groove (first shaft raceway surface) by making the height of the groove edge part on the side receiving the load higher than that of the other groove edge part.

In the transmission, the first rolling element may be a ball, the first shaft raceway surface may be a groove extending in a circumferential direction of the outer peripheral surface of the first shaft, the first shaft may include a raceway surface forming part that is a portion at which the first shaft raceway surface is provided, and an intermediate part that is a portion between the raceway surface forming part and the first output gear, and the intermediate part may have an outer diameter larger than an outer diameter of the raceway surface forming part. In this case, the transmission can improve rigidity around a first gear on the first shaft.

In the transmission, a shape of the groove of the first shaft raceway surface in an axial direction of the first shaft may be an arc shape along a raceway groove virtual circle, and the intermediate part and the first output gear may not interfere with the raceway groove virtual circle. In this case, in the transmission, the ball serving as the first rolling element can be appropriately disposed in the groove serving as the first shaft raceway surface without interfering with the intermediate part and the first output gear.

In the transmission described above, a gap having a predetermined reference length or more may be provided between the first outer ring and the intermediate part in the axial direction of the first shaft. In this case, even when the ball serving as the first rolling element moves in the axial direction of the first shaft during rotation of the first shaft, the transmission can prevent the ball serving as the first rolling element from interfering with the intermediate part.

The transmission may further include a retainer configured to retain each of the plurality of rolling elements in a freely rolling manner, and the retainer may protrude outwards from an end of the first outer ring in the axial direction of the first shaft. Here, a general bearing including an inner ring, an outer ring, a plurality of rolling elements, and a retainer that retains the rolling elements is transported in a state in which the inner ring, the outer ring, the plurality of rolling elements, and the retainer are assembled with each other in advance, and is assembled with a transmission. Such a bearing has a configuration in which the retainer does not protrude from the inner ring and the outer ring in the axial direction so that the retainer is not damaged by an impact or the like from the outside when the bearing is transported. In contrast, the transmission of the present application does not have a general bearing configuration in which the inner ring, the outer ring, the plurality of rolling elements, and the retainer are assembled, and is not subject to structural restrictions to prevent damage to the retainer during transportation thereof. For this reason, in the transmission, the restriction imposed on the retainer can be prevented, and a degree of freedom in designing the retainer can be increased.

In the transmission, a first oil passage extending in the axial direction of the first shaft may be provided in an inside of the first shaft, a first oil hole communicating with the first oil passage and the outer peripheral surface of the first shaft may be provided in the first shaft, and at least a part of an opening part of the first oil hole in the outer peripheral surface of the first shaft may face the inner peripheral surface of the first outer ring in a radial direction of the first shaft. In this case, the transmission can improve performance of supplying lubricating oil to the first shaft raceway surface and the first outer ring raceway surface.

In the transmission, the first oil hole may extend in the radial direction of the first shaft, and may be provided on an upstream side of the first shaft raceway surface in an oil flow direction of the first oil passage in the axial direction of the first shaft. In this case, in the transmission, a supply path of the lubricating oil to the first shaft raceway surface and the like can be shortened, thereby making it possible to more appropriately supply the lubricating oil.

In the transmission, an O-ring disposed so as to surround the first outer ring may be provided between an outer peripheral surface of the first outer ring and the first support part. In this case, the transmission can prevent occurrence of creep due to the first outer ring receiving a rotational load or whirling.

In the transmission, an outer peripheral surface of the first outer ring may be provided with a coating having friction lower than friction of the outer peripheral surface of the first outer ring. In this case, the transmission can prevent occurrence of creep due to the first outer ring receiving a rotational load or whirling.

The transmission may further include a second shaft unit to which power is transmitted from the first shaft unit, in which the second shaft unit may include: a second shaft including a second shaft raceway surface on an outer peripheral surface thereof; a second input gear provided on the second shaft, in which the second input gear meshes with the first output gear and is configured to rotate integrally with the second shaft; a second output gear provided on the second shaft and configured to rotate integrally with the second shaft; a second outer ring attached to a second support part supporting the second shaft and provided so as to surround the second shaft raceway surface, the second outer ring including a second outer ring raceway surface on an inner peripheral surface thereof; and a plurality of second rolling elements disposed between the second shaft raceway surface and the second outer ring raceway surface. A rotation axis of the first shaft and a rotation axis of the second shaft may be parallel to each other. In this case, in the transmission, the second shaft to which the power is transmitted from the first shaft unit is rotatably supported by the second support part via the second rolling element and the second outer ring. That is, the second shaft also functions as an inner ring of a bearing. Accordingly, in the transmission, the number of components of a mechanism that supports the second shaft can be reduced, and it is possible to prevent deterioration in support accuracy of the second shaft due to variations in component accuracy or the like. Therefore, in the transmission, the second shaft (rotation shaft) to which power is transmitted from the first shaft unit can be stably and rotatably supported.

In the transmission, the second rolling element may be a tapered roller, the second shaft raceway surface may have a truncated cone shape, the second shaft may further include a second small flange part provided so as to be adjacent to a small diameter side end of the second shaft raceway surface including the truncated cone shape, a second oil passage extending in an axial direction of the second shaft may be provided in an inside of the second shaft, and a second oil hole communicating with the second oil passage and an outer peripheral surface of the second small flange part may be provided in the second shaft. In this case, the transmission rotatably supports the second shaft by a structure of a tapered roller bearing. In the transmission, lubricating oil can be supplied from the outer peripheral surface of the second small flange part to the second shaft raceway surface and the like, and lubricating oil can be more appropriately supplied by a pump action of the tapered roller bearing.

In the transmission, the second rolling element may be a ball, the second shaft raceway surface may be a groove extending in a circumferential direction of the outer peripheral surface of the second shaft, a second oil passage extending in an axial direction of the second shaft may be provided in an inside of the second shaft, a second oil hole communicating with the second oil passage and the outer peripheral surface of the second shaft may be provided in an inside of the second shaft, and the second oil hole may have an opening part open to the outer peripheral surface of the second shaft and adjacent to the second shaft raceway surface. In this case, the transmission can appropriately supply lubricating oil to the second shaft raceway surface and the like through the second oil hole.

In the transmission, the second rolling element may be a tapered roller, the second shaft raceway surface may have a truncated cone shape, and the second shaft may not be provided with a small flange part adjacent to a small diameter side end of the second shaft raceway surface having the truncated cone shape. In this case, in the transmission, assembly performance of each part of the second shaft unit can be improved.

The above-described transmission may further include a differential gear unit to which power is transmitted from the second shaft unit, in which the differential gear unit includes: a differential case including a third shaft raceway surface on an outer peripheral surface thereof; a third input gear provided on the differential case, in which the third input gear meshes with the second output gear and is configured to rotate integrally with the differential case; a differential mechanism provided in the differential case; a third outer ring attached to a third support part supporting the differential case and provided so as to surround the third shaft raceway surface, the third outer ring including a third outer ring raceway surface on an inner peripheral surface thereof; and a plurality of third rolling elements disposed between the third shaft raceway surface and the third outer ring raceway surface. The rotation axis of the second shaft and a rotation axis of the differential case are parallel to each other. In this case, the differential case to which power is transmitted from the second shaft unit is rotatably supported by the third support part via the third rolling element and the third outer ring. That is, the differential case also functions as an inner ring of a bearing. Accordingly, in the transmission, the number of components of a mechanism that supports the differential case can be reduced, and it is possible to prevent deterioration in support accuracy of the differential case due to variations in component accuracy or the like. Therefore, in the transmission, the differential case (rotation shaft) to which power is transmitted from the second shaft unit can be stably and rotatably supported.

In the transmission, the third rolling element may be a tapered roller, the third shaft raceway surface may have a truncated cone shape, the differential case may further include a third small flange part provided so as to be adjacent to a small diameter side end of the third shaft raceway surface including the truncated cone shape, a third oil passage may be provided in an inside of the differential case, and a third oil hole communicating with the third oil passage and an outer peripheral surface of the third small flange part may be provided in the differential case. In this case, the transmission rotatably supports the differential case by means of a structure of a tapered roller bearing. In the transmission, lubricating oil can be supplied from the outer peripheral surface of the third small flange part to the third shaft raceway surface and the like, and lubricating oil can be more appropriately supplied by a pump action of the tapered roller bearing.

In the transmission, the third rolling element may be a tapered roller, the third shaft raceway surface may have a truncated cone shape, and the differential case may not be provided with a small flange part adjacent to a small diameter side end of the third shaft raceway surface having the truncated cone shape. In this case, in the transmission, it is possible to improve assembly performance of each part of the differential gear unit.

The transmission may further include the drive unit, and the drive unit may include a drive mechanism, a drive shaft including a fourth shaft raceway surface on an outer peripheral surface thereof, the drive shaft being rotationally driven by the drive mechanism and connected to the first shaft, a fourth outer ring attached to a fourth support part that supports the drive shaft, the fourth outer ring being provided to surround the fourth shaft raceway surface and including a fourth outer ring raceway surface on an inner peripheral surface thereof, and a plurality of fourth rolling elements disposed between the fourth shaft raceway surface and the fourth outer ring raceway surface. In this case, the drive shaft of the drive unit is rotatably supported by the fourth support part via the fourth rolling element and the fourth outer ring. That is, the drive shaft also functions as an inner ring of a bearing. Accordingly, in the transmission, the number of components of a mechanism that supports the drive shaft can be reduced, and it is possible to prevent deterioration in support accuracy of the drive shaft due to variations in component accuracy or the like. Therefore, in the transmission, even when the drive unit is provided, the drive shaft (rotation shaft) of the drive unit can be stably and rotatably supported.

In the transmission, a fourth oil passage extending in an axial direction of the drive shaft may be provided in an inside of the drive shaft, a fourth oil hole communicating with the fourth oil passage and the outer peripheral surface of the drive shaft may be provided in the drive shaft, and the fourth oil hole may have an opening part open to the outer peripheral surface of the drive shaft and adjacent to the fourth shaft raceway surface. In this case, the transmission can appropriately supply lubricating oil to the fourth shaft raceway surface and the like through the fourth oil hole.

The transmission may further include the drive unit, and the drive unit may include a drive mechanism; the drive shaft including a fourth shaft raceway surface on an inner peripheral surface thereof, in which the drive shaft is rotationally driven by the drive mechanism and is connected to the first shaft; a fourth inner ring attached to an outer periphery of a fourth support part supporting the drive shaft from an inside of the fourth shaft raceway surface and provided in the inside of the fourth shaft raceway surface, the fourth inner ring including a fourth inner ring raceway surface on an outer peripheral surface thereof; and a plurality of fourth rolling elements disposed between the fourth shaft raceway surface and the fourth inner ring raceway surface. In this case, the drive shaft of the drive unit is rotatably supported by the fourth support part via the fourth rolling element and the fourth inner ring. That is, the drive shaft also functions as an outer ring of a bearing. Accordingly, in the transmission, the number of components of a mechanism that supports the drive shaft can be reduced, and it is possible to prevent deterioration in support accuracy of the drive shaft due to variations in component accuracy or the like. Therefore, in the transmission, even when the drive unit is provided, the drive shaft (rotation shaft) of the drive unit can be stably and rotatably supported.

In the transmission, at least one of the number of teeth of the first output gear and the number of first rolling elements may be a prime number. In the transmission, at least one of the number of teeth of the first output gear, the number of the first rolling elements, the number of teeth of the second input gear, the number of teeth of the second output gear, and the number of the second rolling elements may be a prime number. In the transmission, at least one of the number of teeth of the first output gear, the number of the first rolling elements, the number of teeth of the second input gear, the number of teeth of the second output gear, the number of the second rolling elements, the number of teeth of the third input gear, and the number of the third rolling elements may be a prime number. In the transmission, at least one of the number of teeth of the first output gear, the number of first rolling elements, and the number of the fourth rolling elements may be a prime number. In these cases, the transmission can reduce shake due to resonance of each part.

A transmission according to a second aspect of the present disclosure includes a second shaft unit to which power is transmitted from a first shaft unit connected to a drive shaft of a drive unit, in which the second shaft unit includes: a second shaft including a second shaft raceway surface on an outer peripheral surface thereof; a second input gear provided on the second shaft, in which the second input gear meshes with a first output gear provided on the first shaft unit and is configured to rotate integrally with the second shaft; a second output gear provided on the second shaft and configured to rotate integrally with the second shaft; a second outer ring attached to a second support part supporting the second shaft and provided so as to surround the second shaft raceway surface, the second outer ring including a second outer ring raceway surface on an inner peripheral surface thereof; and a plurality of second rolling elements disposed between the second shaft raceway surface and the second outer ring raceway surface. A rotation axis of a first shaft of the first shaft unit and a rotation axis of the second shaft are parallel to each other.

In the transmission, the second shaft to which power is transmitted from the first shaft unit is rotatably supported by the second support part via the second rolling element and the second outer ring. That is, the second shaft also functions as an inner ring of a bearing. Accordingly, in the transmission, the number of components of a mechanism that supports the second shaft can be reduced, and it is possible to prevent deterioration in support accuracy of the second shaft due to variations in component accuracy or the like. Therefore, in the transmission, the second shaft (rotation shaft) to which power is transmitted from the first shaft unit can be stably and rotatably supported.

A transmission according to a third aspect of the present disclosure includes a differential gear unit to which power is transmitted from a first shaft unit connected to a drive shaft of a drive unit, via a second shaft unit, in which the differential gear unit includes: a differential case including a third shaft raceway surface on an outer peripheral surface thereof; a third input gear provided in the differential case, in which the third input gear meshes with a second output gear provided in the second shaft unit and rotates integrally with the differential case; a differential mechanism provided in the differential case; a third outer ring attached to a third support part supporting the differential case and provided so as to surround the third shaft raceway surface, the third outer ring including a third outer ring raceway surface on an inner peripheral surface thereof; and a plurality of third rolling elements disposed between the third shaft raceway surface and the third outer ring raceway surface. A rotation axis of a first shaft of the first shaft unit, a rotation axis of a second shaft of the second shaft unit, and a rotation axis of the differential case are parallel to each other.

In the transmission, the differential case to which power is transmitted from the second shaft unit is rotatably supported by the third support part via the third rolling element and the third outer ring. That is, the differential case also functions as an inner ring of a bearing. Accordingly, in the transmission, the number of components of a mechanism that supports the differential case can be reduced, and it is possible to prevent deterioration in support accuracy of the differential case due to variations in component accuracy or the like. Therefore, in the transmission, the differential case (rotation shaft) to which power is transmitted from the second shaft unit can be stably and rotatably supported.

Advantageous Effects of Invention

According to various aspects of the present disclosure, a rotation shaft can be stably and rotatably supported.

DESCRIPTION OF EMBODIMENTS

Figure 1:
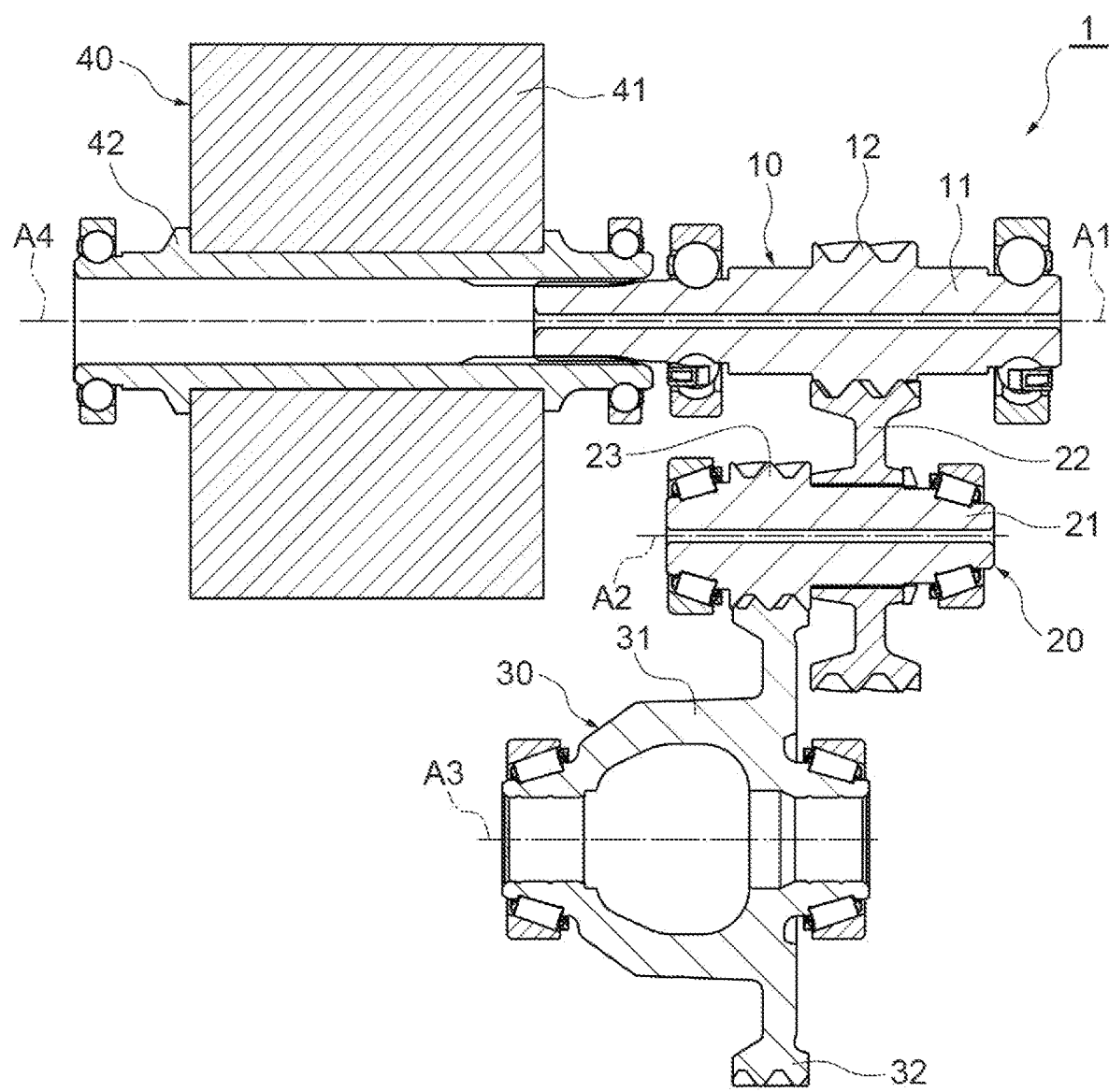
FIG. 1 is a cross-sectional view illustrating a main part of a speed reducer according to an embodiment.

Hereinafter, embodiments of the present disclosure will be described with reference to the drawings. It is noted that, in the drawings, the same or corresponding elements are denoted by the same reference numerals, and a redundant description thereof will be omitted. In the following description, a speed reducer that decelerates the rotational speed of a drive unit will be used as a transmission according to the present disclosure.

As illustrated in FIG. 1, a speed reducer (transmission) 1 includes an input gear unit (first shaft unit) 10, a counter gear unit (second shaft unit) 20, a differential gear unit 30, and a drive unit 40. The drive unit 40 includes an electric motor. As an example, the speed reducer 1 in the present embodiment is configured as a three-axis parallel speed reducer for an electric vehicle (EV) including the drive unit 40. Although not illustrated in FIG. 1, the speed reducer 1 includes a housing that houses each mechanism such as the input gear unit 10.

[Configuration of Input Gear Unit]

Figure 2:
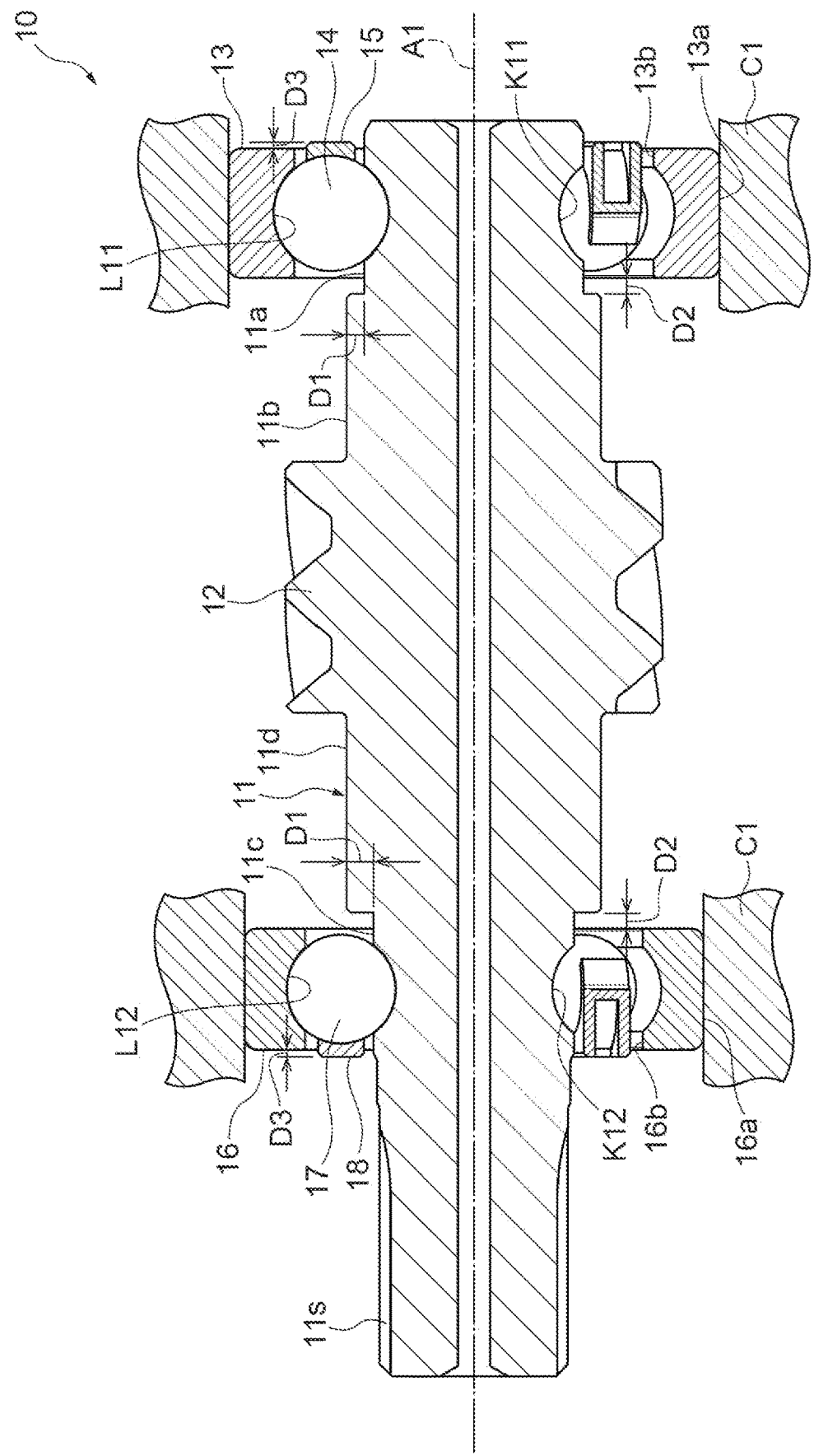
FIG. 2 is an enlarged cross-sectional view around an input gear unit in FIG. 1.

The input gear unit 10 is connected to a rotor shaft 42 of the drive unit 40. That is, the rotation of the rotor shaft 42 of the drive unit 40 is directly transmitted to the input gear unit 10. More specifically, as illustrated in FIG. 2, the input gear unit 10 includes an input shaft (first shaft) 11, an input shaft output gear (first output gear) 12, a first input shaft outer ring (first outer ring) 13, a plurality of rolling elements (first rolling elements) 14, a first input shaft retainer (retainer) 15, a second input shaft outer ring (first outer ring) 16, a plurality of rolling elements (first rolling elements) 17, and a second input shaft retainer (retainer) 18.

The input shaft 11 is connected to the rotor shaft 42 of the drive unit 40. Here, in the input shaft 11, a spline 11s is formed on the outer peripheral surface of an end on the side connected to the rotor shaft 42. The input shaft 11 is spline-coupled with the rotor shaft 42 by the spline 11s. In addition, the input shaft 11 has a first input shaft raceway surface (first shaft raceway surface) K11 and a second input shaft raceway surface (first shaft raceway surface) K12 on the outer peripheral surface.

The first input shaft raceway surface K11 is provided on the outer peripheral surface of the input shaft 11 in the vicinity of an end opposite an end of the side on which the spline 11s is formed. The second input shaft raceway surface K12 is provided on the outer peripheral surface of the input shaft 11 in the vicinity of the spline 11s. The first input shaft raceway surface K11 and the second input shaft raceway surface K12 are grooves extending in the circumferential direction of the outer peripheral surface of the input shaft 11.

The input shaft output gear 12 is provided on the input shaft 11 and rotates integrally with the input shaft 11. The input shaft output gear 12 is provided at a position between the first input shaft raceway surface K11 and the second input shaft raceway surface K12. In the present embodiment, the input shaft output gear 12 is provided integrally with the input shaft 11. The input shaft output gear 12 outputs power to the counter gear unit 20.

The first input shaft outer ring 13 is attached to an input shaft support part (first support part) C1 that supports the input shaft 11. It is noted that the input shaft support part C1 is, for example, a portion of a housing that houses the input gear unit 10 and the like. The first input shaft outer ring 13 is provided so as to surround the first input shaft raceway surface K11. The first input shaft outer ring 13 has an outer peripheral surface 13a attached to the input shaft support part C1 and an inner peripheral surface 13b facing the outer peripheral surface (first input shaft raceway surface K11) of the input shaft 11.

The first input shaft outer ring 13 has a first input shaft outer ring raceway surface (first outer ring raceway surface) L11 on the inner peripheral surface 13b. The first input shaft outer ring raceway surface L11 is a groove extending in the circumferential direction of the inner peripheral surface 13b of the first input shaft outer ring 13.

The plurality of rolling elements 14 are disposed between the first input shaft raceway surface K1l of the input shaft 11 and the first input shaft outer ring raceway surface L11 of the first input shaft outer ring 13. The rolling elements 14 are spherical balls. The first input shaft retainer 15 retains, in a freely rolling manner, each of the plurality of rolling elements 14 between the outer peripheral surface of the input shaft 11 and the inner peripheral surface 13b of the first input shaft outer ring 13.

The second input shaft outer ring 16 is attached to the input shaft support part C1 that supports the input shaft 11. The second input shaft outer ring 16 is provided so as to surround the second input shaft raceway surface K12. The second input shaft outer ring 16 has an outer peripheral surface 16a attached to the input shaft support part C1 and an inner peripheral surface 16b facing the outer peripheral surface (second input shaft raceway surface K12) of the input shaft 11.

The second input shaft outer ring 16 has a second input shaft outer ring raceway surface (first outer ring raceway surface) L12 on the inner peripheral surface 16b. The second input shaft outer ring raceway surface L12 is a groove extending in the circumferential direction of the inner peripheral surface 16b of the second input shaft outer ring 16.

The plurality of rolling elements 17 are disposed between the second input shaft raceway surface K12 of the input shaft 11 and the second input shaft outer ring raceway surface L12 of the second input shaft outer ring 16. The rolling elements 17 are spherical balls. The second input shaft retainer 18 retinas, in a freely rolling manner, each of the plurality of rolling elements 17 between the outer peripheral surface of the input shaft 11 and the inner peripheral surface 16b of the second input shaft outer ring 16.

In this manner, the input shaft 11 is rotatably supported at two portions including a portion of the first input shaft raceway surface K11 and a portion of the second input shaft raceway surface K12. In addition, the input gear unit 10 in the present embodiment does not have a component that functions only as an inner ring of a bearing. In the input gear unit 10 in the present embodiment, the input shaft 11 also functions as an inner ring of a bearing.

Further, in the input gear unit 10 according to the present embodiment, the first input shaft outer ring 13, the rolling elements 14, and the first input shaft raceway surface K11 of the input shaft 11 constitute a deep groove ball bearing. Similarly, the second input shaft outer ring 16, the rolling elements 17, and the second input shaft raceway surface K12 of the input shaft 11 constitute a deep groove ball bearing.

The input shaft 11 in the present embodiment includes a first raceway surface forming part (raceway surface forming part) 11a and a first intermediate part (intermediate part) 11b. The first raceway surface forming part 11a is a portion of the input shaft 11, in which the first input shaft raceway surface K11 is provided at the portion. The first intermediate part 11b is a portion of the input shaft 11, in which the portion is located between the first raceway surface forming part 11a and a portion at which the input shaft output gear 12 is provided. The outer diameter of the first intermediate part 11b is larger than the outer diameter of the first raceway surface forming part 11a. That is, a connection portion between the first raceway surface forming part 11a and the first intermediate part 11b forms a step part. A step height D1, which is a difference between the radius of the first intermediate part 11b and the radius of the first raceway surface forming part 11a, is preferably equal to or larger than a predetermined height.

Similarly, the input shaft 11 in the present embodiment includes a second raceway surface forming part (raceway surface forming part) 11c and a second intermediate part (intermediate part) 11d. The second raceway surface forming part 11c is a portion of the input shaft 11, in which the second input shaft raceway surface K12 is provided at the portion. The second intermediate part 11d is a portion of the input shaft 11, in which the portion is located between the second raceway surface forming part 11c and a portion at which the input shaft output gear 12 is provided. The outer diameter of the second intermediate part 11d is larger than the outer diameter of the second raceway surface forming part 11c. That is, a connection portion between the second raceway surface forming part 11c and the second intermediate part 11d forms a step part. A step height D1, which is a difference between the radius of the second intermediate part 11d and the radius of the second raceway surface forming part 11c, is preferably equal to or larger than a predetermined height.

A gap having a predetermined reference length D2 or larger is provided between the first input shaft outer ring 13 and the first intermediate part 11b in the axial direction (extending direction) of the input shaft 11. Similarly, a gap having a predetermined reference length D2 or larger is provided between the second input shaft outer ring 16 and the second intermediate part 11d in the axial direction of the input shaft 11.

The first input shaft retainer 15 protrudes outwards from the end of the first input shaft outer ring 13 in the axial direction of the input shaft 11. In the present embodiment, the first input shaft retainer 15 protrudes, on the both ends of the first input shaft outer ring 13 in the axial direction of the input shaft 11, from an end opposite an end of the side on which the input shaft output gear 12 is provided. A protrusion amount D3 of the first input shaft retainer 15 is equal to or less than a predetermined reference protrusion amount.

Similarly, the second input shaft retainer 18 protrudes outwards from the end of the second input shaft outer ring 16 in the axial direction of the input shaft 11. In the present embodiment, the second input shaft retainer 18 protrudes, on the both ends of the second input shaft outer ring 16 in the axial direction of the input shaft 11, from an end opposite an end of the side on which the input shaft output gear 12 is provided. A protrusion amount D3 of the second input shaft retainer 18 is equal to or less than a predetermined reference protrusion amount.

Figure 3:
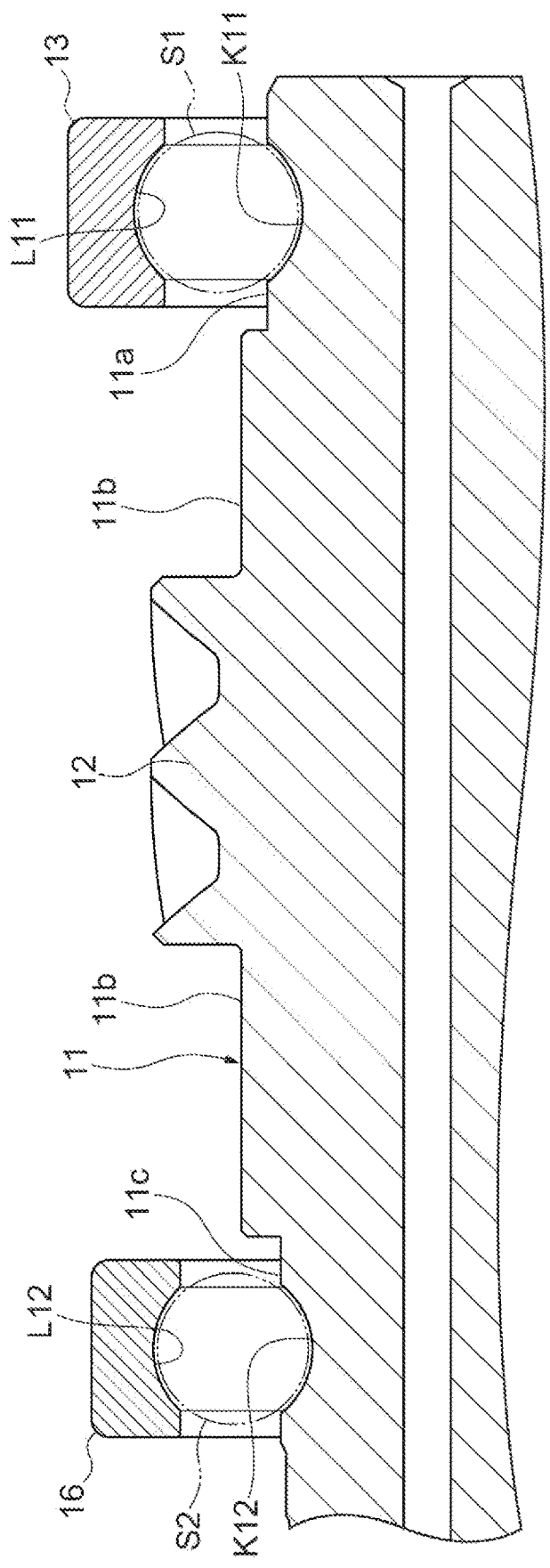
FIG. 3 is an enlarged cross-sectional view around a first input shaft raceway surface and a second input shaft raceway surface.

As illustrated in FIG. 3, the shape of the groove of the first input shaft raceway surface K11 in the axial direction of the input shaft 11 is an arc shape along a raceway groove virtual circle S1. The first intermediate part 11b and the input shaft output gear 12 do not interfere with the raceway groove virtual circle S1. Similarly, the shape of the groove of the second input shaft raceway surface K12 in the axial direction of the input shaft 11 is an arc shape along a raceway groove virtual circle S2. The second intermediate part 11d and the input shaft output gear 12 do not interfere with the raceway groove virtual circle S2. It is noted that, in FIG. 3, the rolling elements 14, the first input shaft retainer 15, the rolling elements 17, and the second input shaft retainer 18 are omitted in order to illustrate the raceway groove virtual circles S1 and S2.

[Configuration of Counter Gear Unit]

Figure 4:
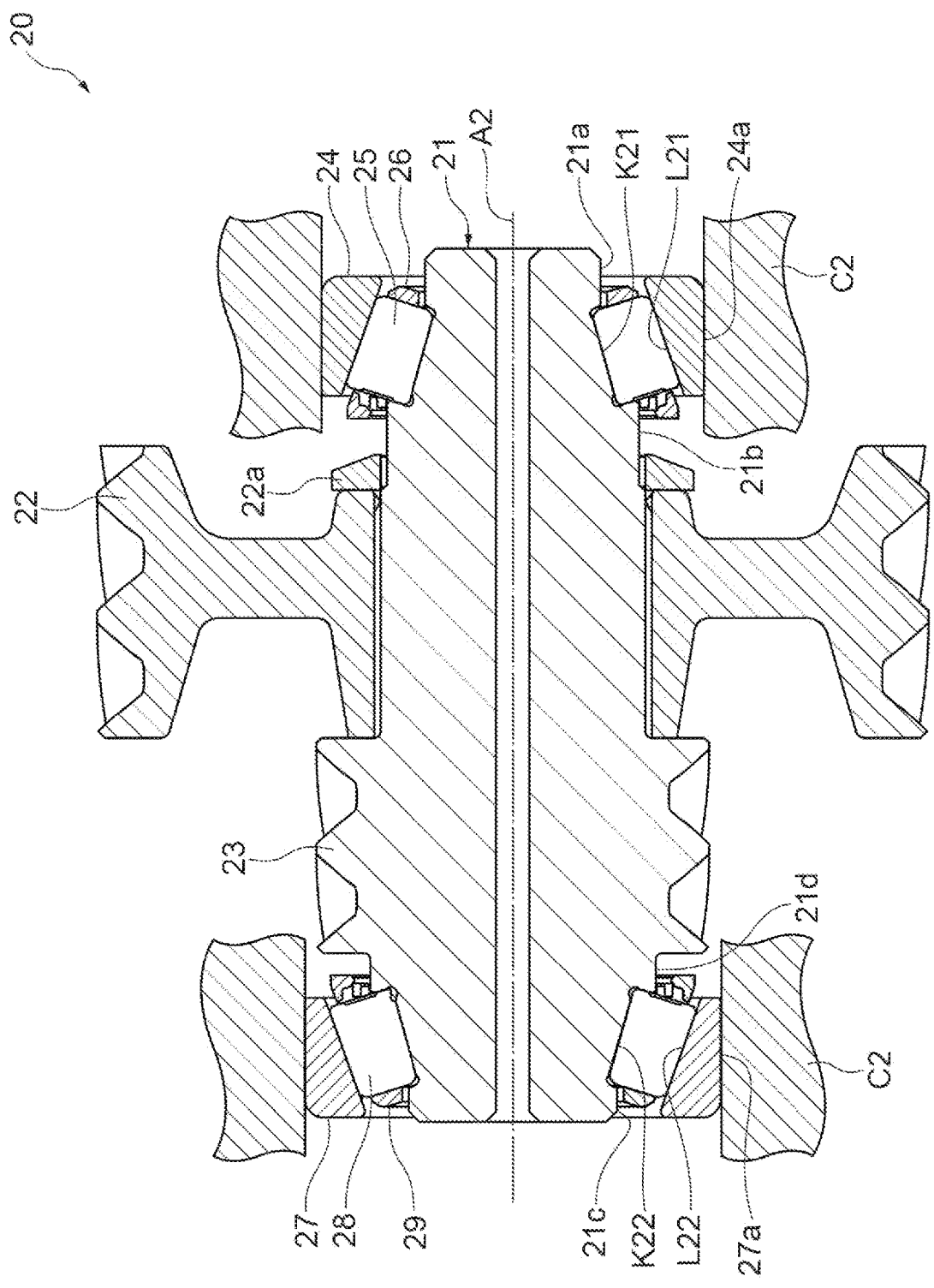
FIG. 4 is an enlarged cross-sectional view around a counter gear unit in FIG. 1.

As illustrated in FIG. 1, power is transmitted from the input gear unit 10 to the counter gear unit 20. More specifically, as illustrated in FIG. 4, the counter gear unit 20 includes a counter shaft (second shaft) 21, a counter shaft input gear (second input gear) 22, a counter shaft output gear (second output gear) 23, a first counter shaft outer ring (second outer ring) 24, a plurality of rolling elements (second rolling elements) 25, a first counter shaft retainer 26, a second counter shaft outer ring (second outer ring) 27, a plurality of rolling elements (second rolling elements) 28, and a second counter shaft retainer 29.

Power is transmitted from the input gear unit 10 to the counter shaft 21 via the counter shaft input gear 22. The rotation axis A2 of the counter shaft 21 and the rotation axis A1 of the input shaft 11 are parallel to each other (refer to FIG. 1). The counter shaft 21 has a first counter shaft raceway surface (second shaft raceway surface) K21 and a second counter shaft raceway surface (second shaft raceway surface) K22 on the outer peripheral surface thereof.

The first counter shaft raceway surface K21 is provided on the outer peripheral surface in the vicinity of one end of the counter shaft 21. The first counter shaft raceway surface K21 has a truncated cone shape, the diameter of which decreases toward one end side of the counter shaft 21. The second counter shaft raceway surface K22 is provided on the outer peripheral surface in the vicinity of the other end of the counter shaft 21. The second counter shaft raceway surface K22 has a truncated cone shape, the diameter of which decreases toward the other end side of the counter shaft 21.

The counter shaft input gear 22 is provided on the counter shaft 21 and rotates integrally with the counter shaft 21. The counter shaft input gear 22 is provided at a position between the first counter shaft raceway surface K21 and the second counter shaft raceway surface K22. The counter shaft input gear 22 meshes with the input shaft output gear 12 of the input gear unit 10. As a result, power is transmitted from the input gear unit 10 to the counter shaft 21 via the counter shaft input gear 22.

In the present embodiment, the counter shaft input gear 22 is provided separately from the counter shaft 21. For example, the counter shaft 21 and the counter shaft input gear 22 are spline-coupled. In this case, for example, a nut 22a may prevent the counter shaft input gear 22 from being separated from the counter shaft 21.

The number of teeth provided in the counter shaft input gear 22 is larger than the number of teeth provided in the input shaft output gear 12 of the input gear unit 10. Therefore, when power is transmitted from the input gear unit 10 to the counter gear unit 20, the rotational speed is reduced.

The counter shaft output gear 23 is provided on the counter shaft 21 and rotates integrally with the counter shaft 21. The counter shaft output gear 23 is provided at a position between the counter shaft input gear 22 and the second counter shaft raceway surface K22. In the present embodiment, the counter shaft output gear 23 is provided integrally with the counter shaft 21. The counter shaft output gear 23 outputs power to the differential gear unit 30.

The first counter shaft outer ring 24 is attached to a counter shaft support part (second support part) C2 that supports the counter shaft 21. It is noted that the counter shaft support part C2 is, for example, a portion of a housing that houses the input gear unit 10 and the like. The first counter shaft outer ring 24 is provided so as to surround the first counter shaft raceway surface K21. The first counter shaft outer ring 24 has an outer peripheral surface 24a attached to the counter shaft support part C2. A first counter shaft outer ring raceway surface (second outer ring raceway surface) L21 facing the first counter shaft raceway surface K21 is provided on the inner peripheral surface of the first counter shaft outer ring 24. The first counter shaft outer ring raceway surface L21 has a truncated cone shape, the diameter of which decreases toward one end side of the counter shaft 21.

The plurality of rolling elements 25 are disposed between the first counter shaft raceway surface K21 of the counter shaft 21 and the first counter shaft outer ring raceway surface L21 of the first counter shaft outer ring 24. The rolling elements 25 are tapered rollers. The first counter shaft retainer 26 retains, in a freely rolling manner, each of the plurality of rolling elements 25 between the first counter shaft raceway surface K21 of the counter shaft 21 and the first counter shaft outer ring raceway surface L21 of the first counter shaft outer ring 24.

It is noted that the counter shaft 21 includes a first counter shaft small flange part (second small flange part) 21a provided adjacent to a small diameter side end of the first counter shaft raceway surface K21 and a first counter shaft large flange part 21b provided adjacent to a large diameter side end of the first counter shaft raceway surface K21.

The second counter shaft outer ring 27 is attached to the counter shaft support part (second support part) C2 that supports the counter shaft 21. The second counter shaft outer ring 27 is provided so as to surround the second counter shaft raceway surface K22. The second counter shaft outer ring 27 has an outer peripheral surface 27a attached to the counter shaft support part C2. A second counter shaft outer ring raceway surface (second outer ring raceway surface) L22 facing the second counter shaft raceway surface K22 is provided on the inner peripheral surface of the second counter shaft outer ring 27. The second counter shaft outer ring raceway surface L22 has a truncated cone shape, the diameter of which decreases toward the other end side of the counter shaft 21.

The plurality of rolling elements 28 are disposed between the second counter shaft raceway surface K22 of the counter shaft 21 and the second counter shaft outer ring raceway surface L22 of the second counter shaft outer ring 27. The rolling elements 28 are tapered rollers. The second counter shaft retainer 29 retains, in a freely rolling manner, each of the plurality of rolling elements 28 between the second counter shaft raceway surface K22 of the counter shaft 21 and the second counter shaft outer ring raceway surface L22 of the second counter shaft outer ring 27.

It is noted that the counter shaft 21 includes a second counter shaft small flange part 21c provided adjacent to a small diameter side end of the second counter shaft raceway surface K22 and a second counter shaft large flange part 21d provided adjacent to a large diameter side end of the second counter shaft raceway surface K22.

In this manner, the counter shaft 21 is rotatably supported at two portions including a portion of the first counter shaft raceway surface K21 and a portion of the second counter shaft raceway surface K22. In addition, the counter gear unit 20 in the present embodiment does not have a component that functions only as an inner ring of a bearing. In the counter gear unit 20 in the present embodiment, the counter shaft 21 also functions as an inner ring of a bearing.

Further, in the counter gear unit 20 according to the present embodiment, the first counter shaft outer ring 24, the rolling elements 25, and the first counter shaft raceway surface K21 of the counter shaft 21 constitute a tapered roller bearing. Similarly, the second counter shaft outer ring 27, the rolling elements 28, and the second counter shaft raceway surface K22 of the counter shaft 21 constitute a tapered roller bearing.

[Configuration of Differential Gear Unit]

Figure 5:
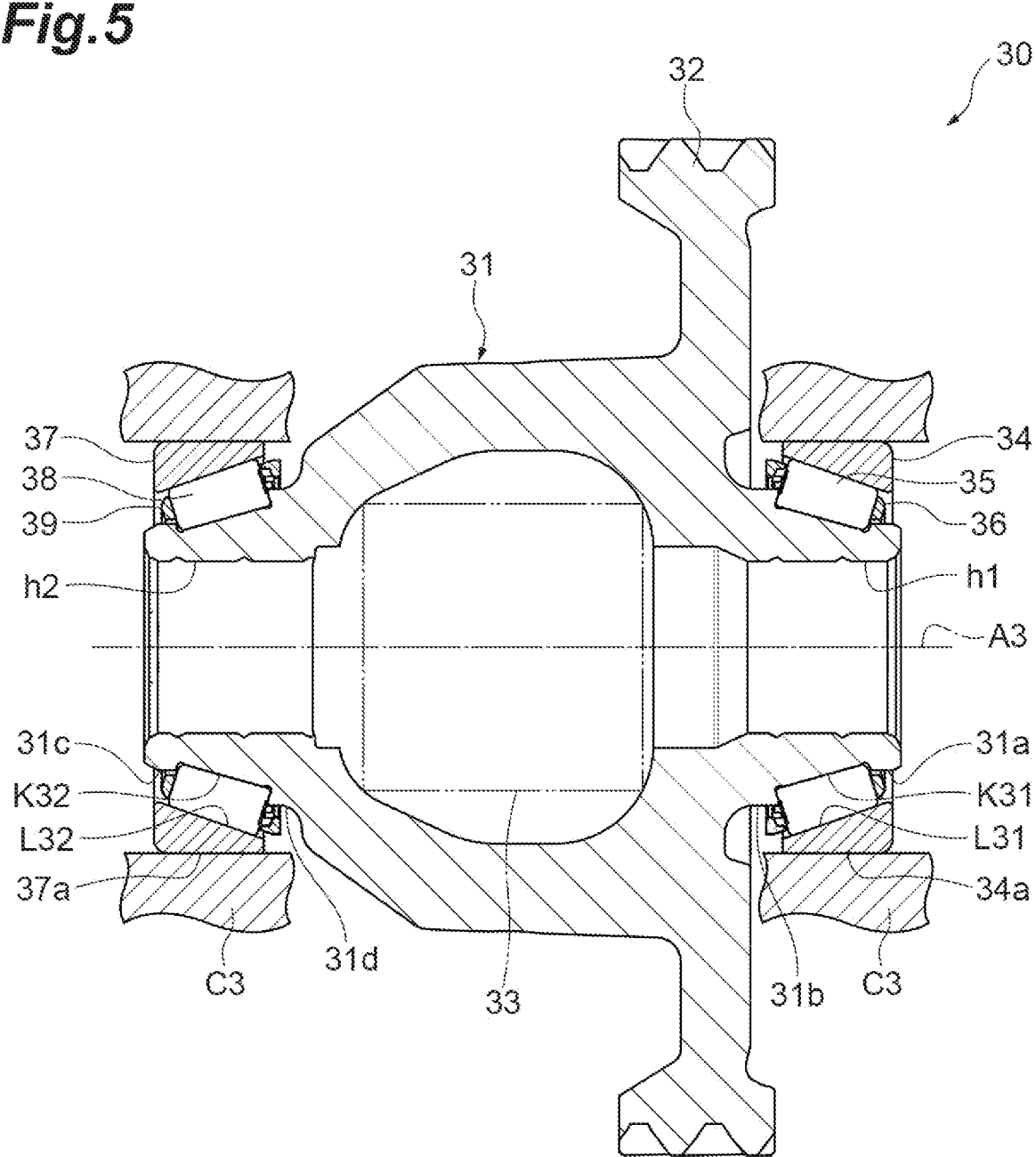
FIG. 5 is an enlarged cross-sectional view around a differential gear unit in FIG. 1.

As illustrated in FIG. 1, power is transmitted from the counter gear unit 20 to the differential gear unit 30. More specifically, as illustrated in FIG. 5, the differential gear unit 30 includes a differential case 31, a differential input (third input gear) gear 32, a differential mechanism 33, a first differential outer ring (third outer ring) 34, a plurality of rolling elements (third rolling elements) 35, a first differential retainer 36, a second differential outer ring (third outer ring) 37, a plurality of rolling elements (third rolling elements) 38, and a second differential retainer 39.

Power is transmitted to the differential case 31 from the counter gear unit 20 via the differential input gear 32. The rotation axis A3 of the differential case 31 and the rotation axis A2 of the counter gear unit 20 are parallel to each other (refer to FIG. 1). The differential case 31 has a housing space for housing the differential mechanism 33 therein. The differential case 31 has a first differential raceway surface (third shaft raceway surface) K31 and a second differential raceway surface (third shaft raceway surface) K32 on the outer peripheral surface thereof.

The first differential raceway surface K31 is provided on the outer peripheral surface in the vicinity of one end of the differential case 31 in the direction of the rotation axis A3. The first differential raceway surface K31 has a truncated cone shape, the diameter of which decreases toward one end side of the differential case 31. The second differential raceway surface K32 is provided on the outer peripheral surface in the vicinity of the other end of the differential case 31 in the direction of the rotation axis A3. The second differential raceway surface K32 has a truncated cone shape, the diameter of which decreases toward the other end side of the differential case 31.

The differential input gear 32 is provided in the differential case 31 and rotates integrally with the differential case 31. The differential case 31 is provided at a position between the first differential raceway surface K31 and the second differential raceway surface K32. The differential input gear 32 meshes with the counter shaft output gear 23 of the counter gear unit 20. As a result, power is transmitted from the counter gear unit 20 to the differential case 31 via the differential input gear 32. In the present embodiment, the differential input gear 32 is provided integrally with the differential case 31.

The number of teeth provided in the differential input gear 32 is larger than the number of teeth provided in the counter shaft output gear 23 of the counter gear unit 20. Therefore, when power is transmitted from the counter gear unit 20 to the differential gear unit 30, rotational speed is decelerated.

The differential mechanism 33 is provided inside the differential case 31. The differential mechanism 33 is, for example, a differential mechanism of a vehicle differential gear unit including a pinion gear, a side gear, and the like. Various known mechanisms can be used as the differential mechanism 33. In the differential case 31, a first insertion port h1 and a second insertion port h2 are provided at the both ends of the differential case 31 in the direction of the rotation axis A3. The differential mechanism 33 transmits driving force to a drive shaft or the like inserted from the first insertion port h1 and the second insertion port h2. It is noted that the first insertion port h1 is located in the first differential raceway surface K31 extending annularly. The second insertion port h2 is located in the second differential raceway surface K32 extending annularly.

The first differential outer ring 34 is attached to a differential support part (third support part) C3 that supports the differential case 31. It is noted that the differential support part C3 is, for example, a portion of a housing that houses the input gear unit 10 and the like. The first differential outer ring 34 is provided so as to surround the first differential raceway surface K31. The first differential outer ring 34 has an outer peripheral surface 34a attached to the differential support part C3. A first differential outer ring raceway surface (third outer ring raceway surface) L31 facing the first differential raceway surface K31 is provided on the inner peripheral surface of the first differential outer ring 34. The first differential outer ring raceway surface L31 has a truncated cone shape, the diameter of which decreases toward one end side of the differential case 31.

The plurality of rolling elements 35 are disposed between the first differential raceway surface K31 of the differential case 31 and the first differential outer ring raceway surface L31 of the first differential outer ring 34. The rolling elements 35 are tapered rollers. The first differential retainer 36 retains, in a freely rolling manner, each of the plurality of rolling elements 35 between the first differential raceway surface K31 of the differential case 31 and the first differential outer ring raceway surface L31 of the first differential outer ring 34.

It is noted that the differential case 31 includes a first differential small flange part 31a provided adjacent to a small diameter side end of the first differential raceway surface K31 and a first differential large flange part 31b provided adjacent to a large diameter side end of the first differential raceway surface K31.

The second differential outer ring 37 is attached to the differential support part C3 that supports the differential case 31. The second differential outer ring 37 is provided so as to surround the second differential raceway surface K32. The second differential outer ring 37 has an outer peripheral surface 37a attached to the differential support part C3. A second differential outer ring raceway surface (third outer ring raceway surface) L32 facing the second differential raceway surface K32 is provided on the inner peripheral surface of the second differential outer ring 37. The second differential outer ring raceway surface L32 has a truncated cone shape, the diameter of which decreases toward the other end side of the differential case 31.

The plurality of rolling elements 38 are disposed between the second differential raceway surface K32 of the differential case 31 and the second differential outer ring raceway surface L32 of the second differential outer ring 37. The rolling elements 38 are tapered rollers. The second differential retainer 39 retains, in a freely rolling manner, each of the plurality of rolling elements 38 between the second differential raceway surface K32 of the differential case 31 and the second differential outer ring raceway surface L32 of the second differential outer ring 37.

It is noted that the differential case 31 includes a second differential small flange part (third small flange part) 31c provided adjacent to a small diameter side end of the second differential raceway surface K32 and a second differential large flange part 31d provided adjacent to a large diameter side end of the second differential raceway surface K32.

In this manner, the differential case 31 is rotatably supported at two portions including a portion of the first differential raceway surface K31 and a portion of the second differential raceway surface K32. In addition, the differential gear unit 30 in the present embodiment does not have a component that functions only as an inner ring of a bearing. In the differential gear unit 30 according to the present embodiment, the differential case 31 also functions as an inner ring of a bearing.

Further, in the differential gear unit 30 according to the present embodiment, the first differential outer ring 34, the rolling element 35, and the first differential raceway surface K31 of the differential case 31 constitute a tapered roller bearing. Similarly, the second differential outer ring 37, the rolling element 38, and the second differential raceway surface K32 of the differential case 31 constitute a tapered roller bearing.

[Configuration of Drive Unit]

Figure 6:
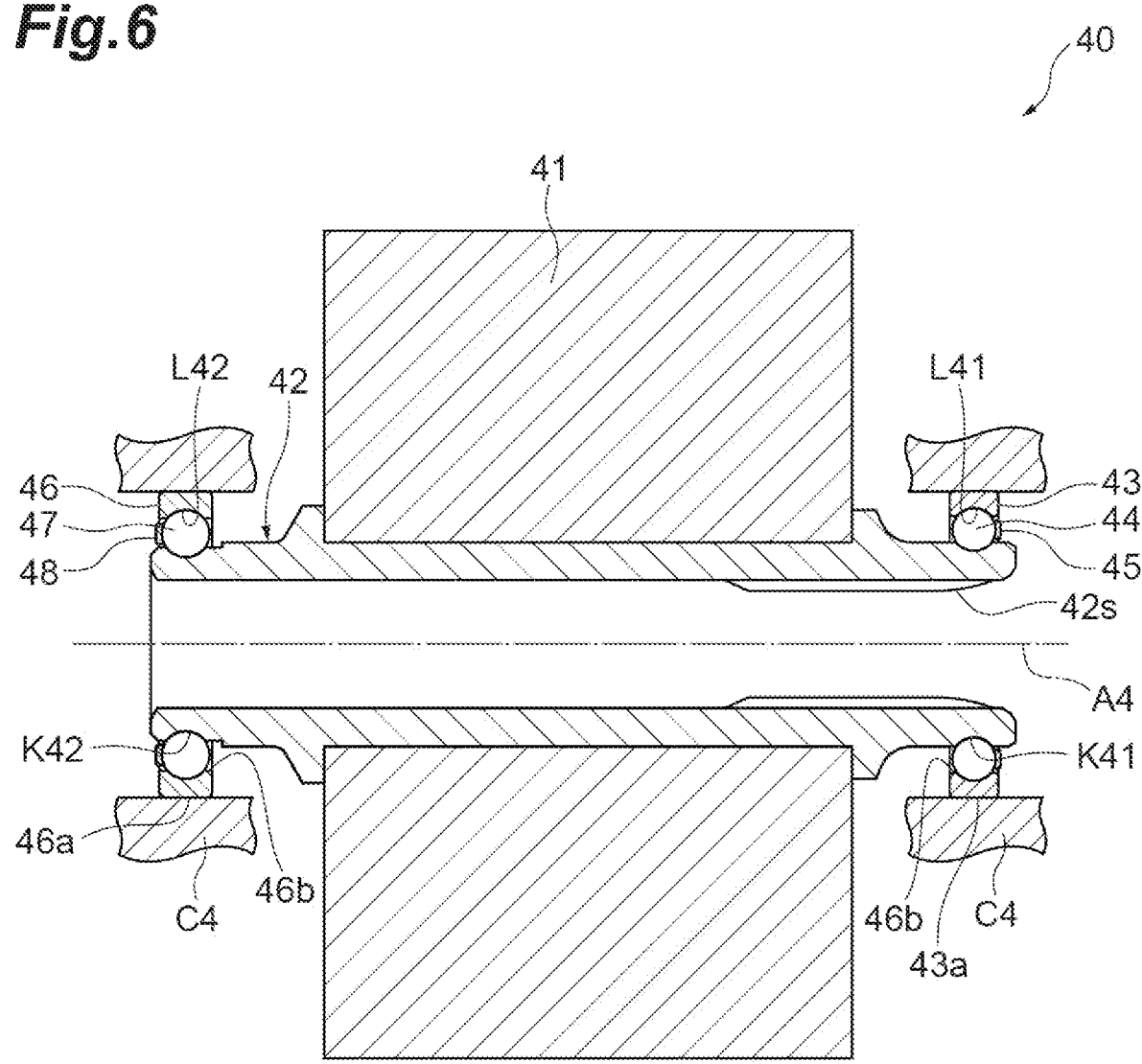
FIG. 6 is an enlarged cross-sectional view around a drive unit in FIG. 1.

As illustrated in FIG. 1, the drive unit 40 constitutes an electric motor unit serving as a drive source of a vehicle. More specifically, as illustrated in FIG. 6, the drive unit 40 includes a motor rotor (drive mechanism) 41, a rotor shaft (drive shaft) 42, a first rotor shaft outer ring (fourth outer ring) 43, a plurality of rolling elements (fourth rolling elements) 44, a first rotor shaft retainer 45, a second rotor shaft outer ring (fourth outer ring) 46, a plurality of rolling elements (fourth rolling elements) 47, and a second rotor shaft retainer 48.

The motor rotor 41 constitutes a rotor of an electric motor. Although not illustrated, the drive unit 40 includes a component such as a magnet constituting an electric motor as a drive mechanism. Furthermore, the drive unit 40 may include an electronic component such as an inverter.

The rotor shaft 42 is provided in a central portion of the motor rotor 41. The rotor shaft 42 is rotationally driven by the motor rotor 41. The rotor shaft 42 serves as an output shaft of driving force of the drive unit 40. The rotor shaft 42 is connected to the input shaft 11 of the input gear unit 10. The rotation axis A4 of the rotor shaft 42 and the rotation axis A1 of the input shaft 11 are on the same axis.

Here, in the rotor shaft 42, a spline 42s is formed on the inner peripheral surface of an end on the side connected to the input shaft 11. The spline 42s of the rotor shaft 42 and the spline 11s of the input shaft 11 are spline-coupled, whereby the rotor shaft 42 and the input shaft 11 are connected to each other. The rotor shaft 42 has a first rotor shaft raceway surface (fourth shaft raceway surface) K41 and a second rotor shaft raceway surface (fourth shaft raceway surface) K42 on the outer peripheral surface thereof.

The first rotor shaft raceway surface K41 is provided on the outer peripheral surface of the rotor shaft 42 in the vicinity of the end on the side connected to the input shaft 11. The second rotor shaft raceway surface K42 is provided on the outer peripheral surface of the rotor shaft 42 in the vicinity of an end opposite the first rotor shaft raceway surface K41. The first rotor shaft raceway surface K41 and the second rotor shaft raceway surface K42 are grooves extending in the circumferential direction of the outer peripheral surface of the rotor shaft 42.

The first rotor shaft outer ring 43 is attached to a rotor shaft support part (fourth support part) C4 that supports the rotor shaft 42. It is noted that the rotor shaft support part C4 is, for example, a portion of a housing that houses the input gear unit 10 and the like. The first rotor shaft outer ring 43 is provided so as to surround the first rotor shaft raceway surface K41. The first rotor shaft outer ring 43 has an outer peripheral surface 43a attached to the rotor shaft support part C4 and an inner peripheral surface 43b facing the outer peripheral surface (first rotor shaft raceway surface K41) of the rotor shaft 42.

The first rotor shaft outer ring 43 has a first rotor shaft outer ring raceway surface (fourth outer ring raceway surface) 141 on the inner peripheral surface 43b. The first rotor shaft outer ring raceway surface L41 is a groove extending in the circumferential direction of the inner peripheral surface 43b of the first rotor shaft outer ring 43.

The plurality of rolling elements 44 are disposed between the first rotor shaft raceway surface K41 of the rotor shaft 42 and the first rotor shaft outer ring raceway surface L41 of the first rotor shaft outer ring 43. The rolling elements 44 are spherical balls. The first rotor shaft retainer 45 retains, in a freely rolling manner, each of the plurality of rolling elements 44 between the outer peripheral surface of the rotor shaft 42 and the inner peripheral surface 43b of the first rotor shaft outer ring 43.

The second rotor shaft outer ring 46 is attached to the rotor shaft support part C4 that supports the rotor shaft 42. The second rotor shaft outer ring 46 is provided so as to surround the second rotor shaft raceway surface K42. The second rotor shaft outer ring 46 has an outer peripheral surface 46a attached to the rotor shaft support part C4 and an inner peripheral surface 46b facing the outer peripheral surface (second rotor shaft raceway surface K42) of the rotor shaft 42.

The second rotor shaft outer ring 46 has a second rotor shaft outer ring raceway surface (fourth outer ring raceway surface) L42 on the inner peripheral surface 46b. The second rotor shaft outer ring raceway surface L42 is a groove extending in the circumferential direction of the inner peripheral surface 46b of the second rotor shaft outer ring 46.

The plurality of rolling elements 47 are disposed between the second rotor shaft raceway surface K42 of the rotor shaft 42 and the second rotor shaft outer ring raceway surface L42 of the second rotor shaft outer ring 46. The rolling elements 47 are spherical balls. The second rotor shaft retainer 48 retains, in a freely rolling manner, each of the plurality of rolling elements 47 between the outer peripheral surface of the rotor shaft 42 and the inner peripheral surface 46b of the second rotor shaft outer ring 46.

In this manner, the rotor shaft 42 is rotatably supported at two portions including a portion of the first rotor shaft raceway surface K41 and a portion of the second rotor shaft raceway surface K42. Further, the drive unit 40 in the present embodiment does not have a component that functions only as an inner ring of a bearing. In the drive unit 40 in the present embodiment, the rotor shaft 42 also functions as an inner ring of a bearing.

In the drive unit 40 according to the present embodiment, the first rotor shaft outer ring 43, the plurality of rolling elements 44, and the first rotor shaft raceway surface K41 of the rotor shaft 42 constitute a tapered roller bearing. Similarly, the second rotor shaft outer ring 46, the rolling element 47, and the second rotor shaft raceway surface K42 of the rotor shaft 42 constitute a tapered roller bearing.

[Number of Gear Teeth and Number of Rolling Elements]

The number of teeth of each gear described above and the number of rolling elements are all prime numbers. Specifically, the number of teeth of the input shaft output gear 12, the number of rolling elements 14 and 17 in the input gear unit 10, the number of teeth of the counter shaft input gear 22 and the counter shaft output gear 23 in the counter gear unit 20, the number of rolling elements 25 and 28, the number of teeth of the differential input gear 32 in the differential gear unit 30, the number of rolling elements 35 and 38, and the number of rolling elements 44 and 47 in the drive unit 40 are all prime numbers.

However, all of the number of teeth of each gear and the number of rolling elements may not be prime numbers. At least one of the number of teeth of each gear and the number of rolling elements may be a prime number. Specifically, for example, at least one of the number of teeth of the input shaft output gear 12 and the number of rolling elements 14 and 17 in the input gear unit 10 may be a prime number. Further, for example, at least one of the number of teeth of the input shaft output gear 12, the number of rolling elements 14 and 17 in the input gear unit 10, the number of teeth of the counter shaft input gear 22 and the counter shaft output gear 23 in the counter gear unit 20, and the number of rolling elements 25 and 28 may be a prime number.

Alternatively, for example, at least one of the number of teeth of the input shaft output gear 12, the number of rolling elements 14 and 17 in the input gear unit 10, the number of teeth of the counter shaft input gear 22 and the counter shaft output gear 23 in the counter gear unit 20, the number of rolling elements 25 and the rolling elements 28, the number of teeth of the differential input gear 32, and the number of rolling elements 35 and 38 in the differential gear unit 30 may be a prime number. For example, at least one of the number of teeth of the input shaft output gear 12, the number of rolling elements 14 and 17 in the input gear unit 10, and the number of rolling elements 44 and 47 in the drive unit 40 may be a prime number.

As described above, in the speed reducer 1, the input shaft 11, which is a rotation shaft connected to the rotor shaft 42 of the drive unit 40, is rotatably supported by the input shaft support part C1 via the rolling elements 14 and the first input shaft outer ring 13 and via the rolling elements 17 and the second input shaft outer ring 16. That is, the input shaft 11 also functions as an inner ring of a bearing. Accordingly, in the speed reducer 1, the number of components of a mechanism that supports the input shaft 11 can be reduced, and deterioration in support accuracy of the input shaft 11 due to variations in component accuracy and the like can be prevented. Further, in the speed reducer 1, since the input shaft 11 also functions as the inner ring of the bearing, the radial size around the bearing can be reduced as compared with a case in which an inner ring is separately provided. In the speed reducer 1, an inclination of the input shaft 11 can also be prevented. Therefore, in the speed reducer 1, the input shaft 11 that is connected to the rotor shaft 42 of the drive unit 40 and rotates at the highest speed can be stably and rotatably supported.

In the input shaft 11 of the speed reducer 1, the outer diameter of the first intermediate part 11b is larger than the outer diameter of the first raceway surface forming part 11a provided with the first input shaft raceway surface K11. Similarly, the outer diameter of the second intermediate part 11d is larger than the outer diameter of the second raceway surface forming part 11c provided with the second input shaft raceway surface K12. In this case, the speed reducer 1 can improve the rigidity of the input shaft 11 around the input shaft output gear 12.

As illustrated in FIG. 3, the first input shaft raceway surface K11 provided on the input shaft 11 has an arc shape along the raceway groove virtual circle S1. The first intermediate part 11b of the input shaft 11 and the input shaft output gear 12 do not interfere with the raceway groove virtual circle S1. Similarly, the second input shaft raceway surface K12 provided on the input shaft 11 has an arc shape along the raceway groove virtual circle S2. The second intermediate part 11d of the input shaft 11 and the input shaft output gear 12 do not interfere with the raceway groove virtual circle S2. In this case, the speed reducer 1 can appropriately arrange the rolling elements 14 in the groove, which is the first input shaft raceway surface K11, without interfering with the first intermediate part 11b and the input shaft output gear 12. Further, the speed reducer 1 can appropriately arrange the rolling elements 17 in the groove, which is the second input shaft raceway surface K12, without interfering with the second intermediate part 11d and the input shaft output gear 12.

In the input shaft 11, a gap equal to or larger than the reference length D2 is provided between the first intermediate part 11b and the first input shaft outer ring 13. In this case, even if the rolling elements 14 move in the axial direction of the input shaft 11 during the rotation of the input shaft 11, the rolling elements 14 can be prevented from interfering with the first intermediate part 11b. Similarly, in the input shaft 11, a gap equal to or larger than the reference length D2 is provided between the second intermediate part 11d and the second input shaft outer ring 16. In this case, even if the rolling elements 17 move in the axial direction of the input shaft 11 during the rotation of the input shaft 11, the rolling elements 17 can be prevented from interfering with the second intermediate part 11d.

In the input gear unit 10, the first input shaft retainer 15 protrudes outwards from the end of the first input shaft outer ring 13. Similarly, the second input shaft retainer 18 protrudes outwards from the end of the second input shaft outer ring 16. Here, a general bearing including an inner ring, an outer ring, a plurality of rolling elements, and a retainer for retaining the rolling elements is transported in a state in which the inner ring, the outer ring, the plurality of rolling elements, and the retainer are assembled with each other in advance, and is assembled with a speed reducer. Such a bearing has a configuration in which the retainer does not protrude from the inner ring and the outer ring in the axial direction so that the retainer is not damaged by an impact or the like from the outside when the bearing is transported. In contrast, the speed reducer 1 in the present embodiment does not have a general bearing configuration in which the inner ring, the outer ring, the plurality of rolling elements, and the retainer are assembled with each other, and is not subject to structural restrictions to prevent damage to the retainer during transportation thereof. For this reason, the speed reducer 1 can prevent restriction imposed on the first input shaft retainer 15 and the second input shaft retainer 18, and can increase a degree of freedom in designing the first input shaft retainer 15 and the second input shaft retainer 18.

Further, the speed reducer 1 also includes the counter gear unit 20. In the speed reducer 1, the counter shaft 21 to which power is transmitted from the input gear unit 10 is rotatably supported by the counter shaft support part C2 via the rolling elements 25 and the first counter shaft outer ring 24 and via the rolling elements 28 and the second counter shaft outer ring 27. That is, the counter shaft 21 also functions as an inner ring of a bearing. Accordingly, in the speed reducer 1, the number of components of a mechanism that supports the counter shaft 21 can be reduced, and deterioration in support accuracy of the counter shaft 21 due to variations in component accuracy and the like can be prevented. Therefore, in the speed reducer 1, similarly to the input shaft 11, the counter shaft 21 to which power is transmitted from the input gear unit 10 can be stably and rotatably supported.

Further, the speed reducer 1 includes the differential gear unit 30. In the speed reducer 1, the differential case 31 to which power is transmitted from the counter gear unit 20 is rotatably supported by the differential support part C3 via the rolling elements 35 and the first differential outer ring 34 and via the rolling elements 38 and the second differential outer ring 37. That is, the differential case 31 also functions as an inner ring of a bearing. Accordingly in the speed reducer 1, the number of components of a mechanism that supports the differential case 31 can be reduced, and it is possible to prevent deterioration in support accuracy of the differential case 31 due to variations in component accuracy or the like. Therefore, in the speed reducer 1, similarly to the input shaft 11 and the like, the differential case 31 to which power is transmitted from the counter gear unit 20 can be stably and rotatably supported.

Further, the speed reducer 1 includes the drive unit 40. In the speed reducer 1, the rotor shaft 42 of the drive unit 40 is rotatably supported by the rotor shaft support part C4 via the rolling elements 44 and the first rotor shaft outer ring 43 and via the rolling elements 47 and the second rotor shaft outer ring 46. That is, the rotor shaft 42 also functions as an inner ring of a bearing. Accordingly, in the speed reducer 1, the number of components of a mechanism that supports the rotor shaft 42 can be reduced, and it is possible to prevent deterioration in support accuracy of the rotor shaft 42 due to variations in component accuracy and the like. Therefore, in the speed reducer 1, similarly to the input shaft 11 and the like, even when the drive unit 40 is provided, the rotor shaft 42 of the drive unit 40 can be stably and rotatably supported.

The number of teeth of each gear described above and the number of rolling elements are all prime numbers, or at least a part thereof is prime numbers. In this case, the speed reducer 1 can reduce shake due to resonance of each part.

[Modification of Input Gear Unit]

Next, a modification of the speed reducer 1 according to the present embodiment will be described. Hereinafter, portions that are different from the above-described embodiment will be mainly described. First, various modifications of the input gear unit 10 will be described.

[First Modification of Input Gear Unit]

Figure 7:
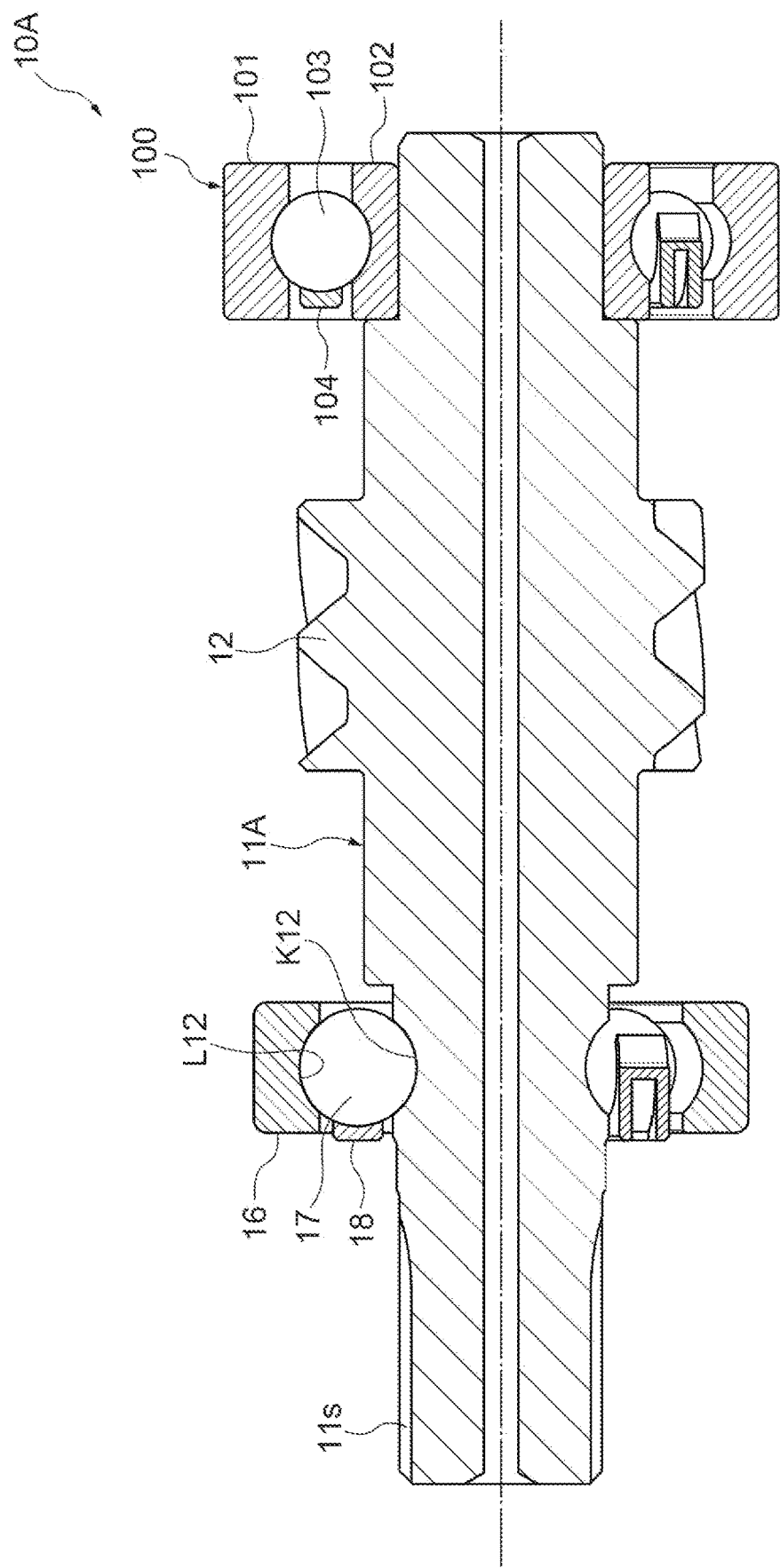
FIG. 7 is an enlarged cross-sectional view of an input gear unit according to a first modification.

As illustrated in FIG. 7, an input gear unit (first shaft unit) 10A according to a first modification is different from the input gear unit 10 according to the embodiment in that only one side has a configuration in which a bearing and an input shaft are formed to be integrated with each other. More specifically, the input gear unit 10A includes an input shaft (first shaft) 11A, the input shaft output gear 12, the second input shaft outer ring 16, the rolling element 17, the second input shaft retainer 18, and a bearing 100.

The bearing 100 is a deep groove ball bearing. The bearing 100 includes an outer ring 101, an inner ring 102, a plurality of rolling elements 103, and a retainer 104. The rolling elements 103 are spherical balls. The rolling elements 103 are disposed between the outer ring raceway surface of the outer ring 101 and the inner ring raceway surface of the inner ring 102. The retainer 104 retains each of the plurality of rolling elements 103 in a freely rolling manner. The inner ring 102 is attached to the outer peripheral surface in the vicinity of an end opposite an end of the side on which the spline 11s is provided in the first raceway surface forming part 11a. The outer peripheral surface of the outer ring 101 is attached to the input shaft support part C1 described above.

In this case as well, at a portion of the input shaft 11A where the second input shaft raceway surface K12 is provided, the input shaft 11A also functions as an inner ring. Therefore, the input gear unit 10A can stably and rotatably support the input shaft 11A.

[Second Modification of Input Gear Unit]

Figure 8:
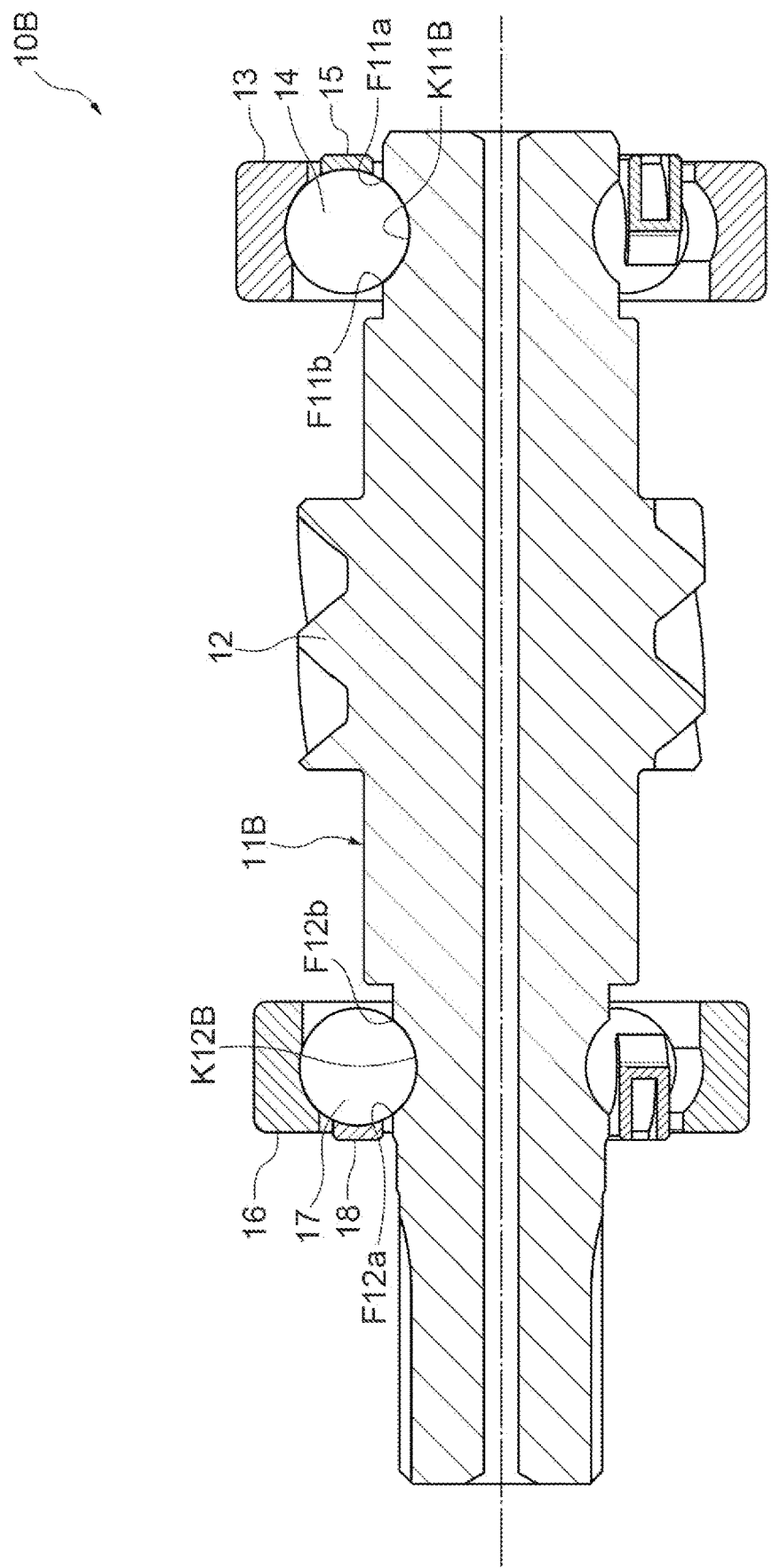
FIG. 8 is an enlarged cross-sectional view of an input gear unit according to a second modification.

As illustrated in FIG. 8, an input gear unit (first shaft unit) 10B according to a second modification is characterized by shapes of a first input shaft raceway surface (first shaft raceway surface) K11B and a second input shaft raceway surface (first shaft raceway surface) K12B. More specifically, the input gear unit 10B includes an input shaft (first shaft) 11B instead of the input shaft 11 of the input gear unit 10 according to the embodiment illustrated in FIG. 2.

The input shaft 11B has the first input shaft raceway surface K11B and the second input shaft raceway surface K12B on the outer peripheral surface thereof. Each of the first input shaft raceway surface K11B and the second input shaft raceway surface K12B is a groove extending in the circumferential direction of the outer peripheral surface of the input shaft 11B.

In the groove forming the first input shaft raceway surface K11B, a pair of edge portions of the groove extending in the circumferential direction of the outer peripheral surface of the input shaft 11B are a groove edge part F11a and a groove edge part F11b. The groove edge part F11b is an edge portion closer to the input shaft output gear 12 than the groove edge part F11a. The groove edge part F11b located on the side closer to the input shaft output gear 12 has a larger diameter than that of the groove edge part F11a. That is, in the first input shaft raceway surface K11B, a shoulder portion (groove edge part F11b) on the side close to the input shaft output gear 12 is higher than the other shoulder portion (groove edge part F11a).

In the groove forming the second input shaft raceway surface K12B, a pair of edge portions of the groove extending in the circumferential direction of the outer peripheral surface of the input shaft 11B are a groove edge part F12a and a groove edge part F12b. The groove edge part F12b is an edge portion closer to the input shaft output gear 12 than the groove edge part F12a. The groove edge part F12b located on the side closer to the input shaft output gear 12 has a larger diameter than that of the groove edge part F12a. That is, in the second input shaft raceway surface K12B, a shoulder portion (groove edge part F12b) on the side close to the input shaft output gear 12 is higher than the other shoulder portion (groove edge part F12a).

As described above, even when the rolling elements 14 and 17 receive a load in the axial direction of the input shaft 11B, the input gear unit 10B can prevent the rolling elements 14 and 17 from riding on the grooves (first input shaft raceway surface K11B and the second input shaft raceway surface K12B) by making the heights of the groove edge parts on the load receiving side (heights of the groove edge part F11b and F12b) higher than those of the other groove edge parts.

[Third Modification of Input Gear Unit]

Figure 9:
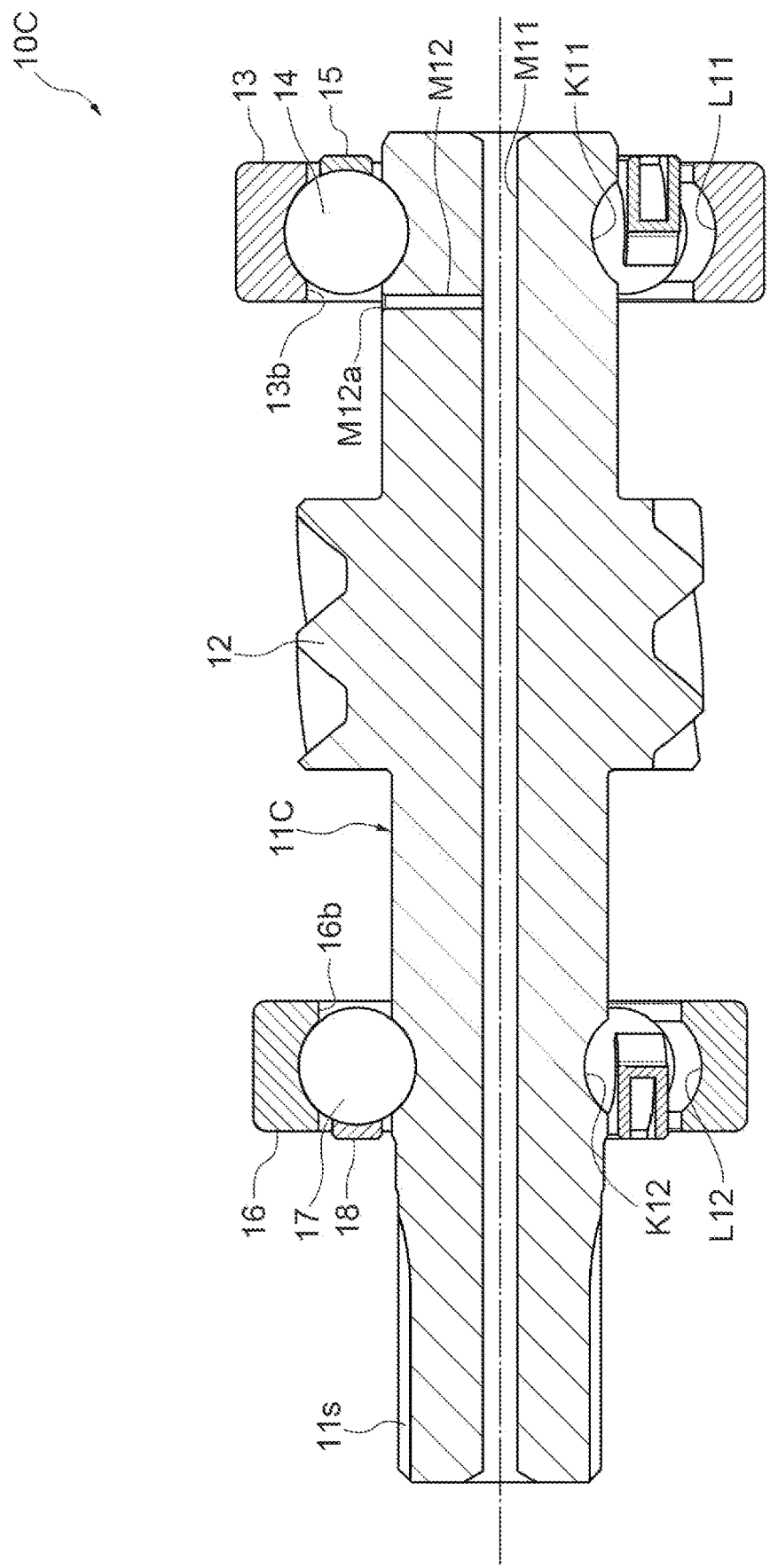
FIG. 9 is an enlarged cross-sectional view of an input gear unit according to a third modification.

As illustrated in FIG. 9, an input gear unit (first shaft unit) 10C according to a third modification includes an input shaft (first shaft) 11C instead of the input shaft 11 of the input gear unit 10 according to the embodiment illustrated in FIG. 2.

Inside the input shaft 11C, a first oil passage M11 extending in the axial direction of the input shaft 11C is provided. Lubricating oil is supplied to the first oil passage M11 from a hydraulic supply source (not illustrated). Furthermore, the input shaft 11C is provided with a first oil hole M12 communicating with the first oil passage M11 and the outer peripheral surface of the input shaft 11C. It is noted that, although only one first oil hole M12 is illustrated in FIG. 9, two or more first oil holes M12 may be provided at different positions in the rotation direction of the input shaft 11C. At least a part of an opening part M12a of the first oil hole M12 on the outer peripheral surface of the input shaft 11C faces the inner peripheral surface 13b of the first input shaft outer ring 13 in the radial direction of the input shaft 11C. That is, lubricating oil can be supplied around the rolling elements 14 from the first oil passage M11 through the opening part M12a of the first oil hole M12.

As described above, at least a part of the opening part M12a of the first oil hole M12 faces the inner peripheral surface 13b of the first input shaft outer ring 13. As a result, in the input gear unit 10C, supply performance of the lubricating oil to the first input shaft raceway surface K11 and the first input shaft outer ring raceway surface L11 can be improved. It is noted that, in the input gear unit 10C according to the third modification, an oil hole may be provided on the rolling element 17 side to supply lubricating oil. Alternatively, lubricating oil may be supplied to both the rolling elements 14 and 17 sides.

[Fourth Modification of Input Gear Unit]

Figure 10:
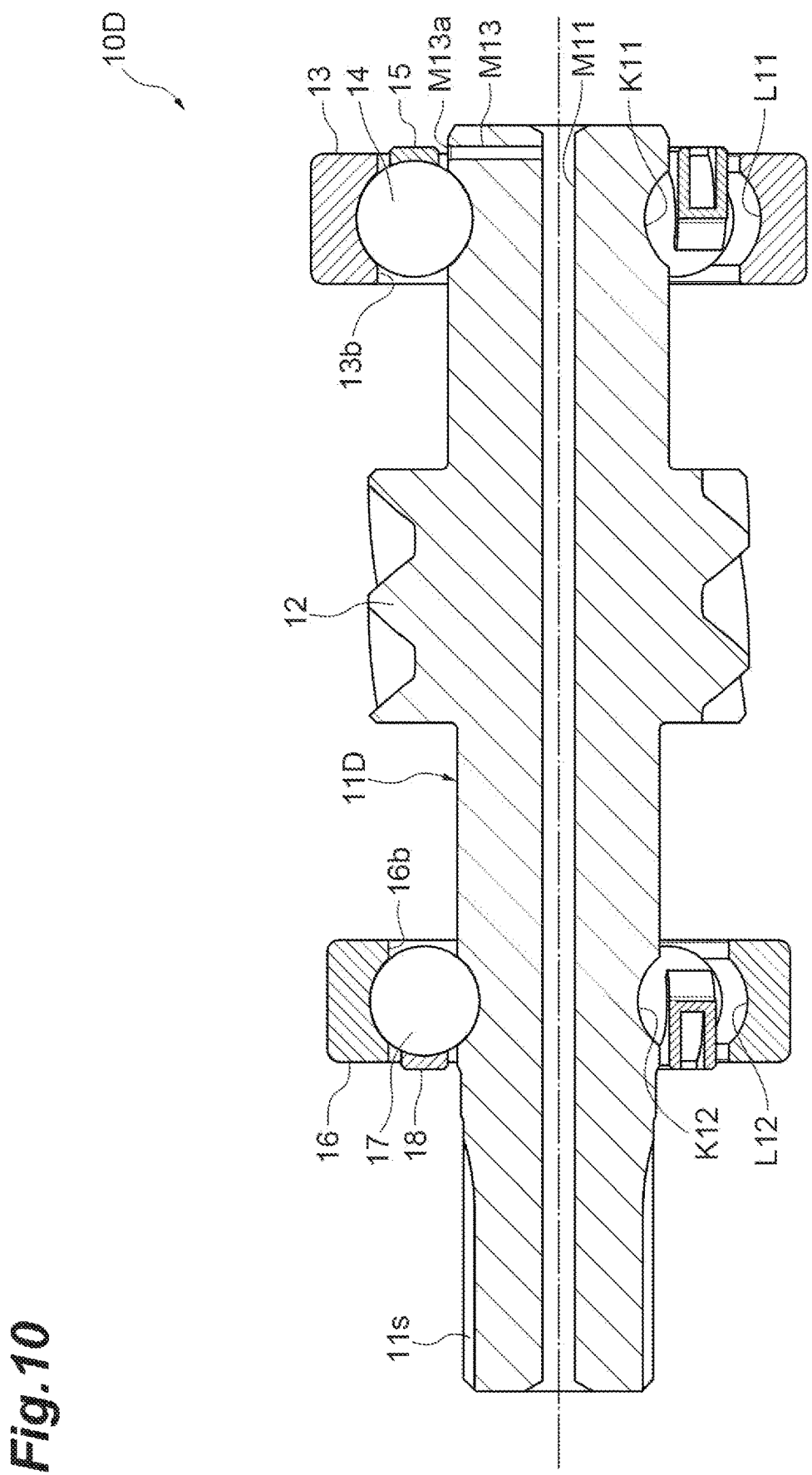
FIG. 10 is an enlarged cross-sectional view of an input gear unit according to a fourth modification.

As illustrated in FIG. 10, an input gear unit (first shaft unit) 10D according to a fourth modification is obtained by changing the position of the first oil hole M12 of the input gear unit 10C according to the third modification illustrated in FIG. 9. More specifically, the input gear unit 10D according to the fourth modification includes a first oil hole M13 provided in an input shaft (first shaft) 11D instead of the first oil hole M12 of the input gear unit 10C according to the third modification. It is noted that, in the first oil passage M11 provided in the input shaft 11D, lubricating oil flows from an end of the side on which the first input shaft raceway surface K11 is formed toward an end of the side on which the spline 11s is provided. That is, in the first oil passage M11, the first input shaft raceway surface K11 side is the upstream side in the flowing direction of the lubricating oil, and the side on which the spline 11s is provided is the downstream side in the flowing direction of the lubricating oil.

The first oil hole M13 extends in the radial direction of the input shaft 11D. It is noted that, although only one first oil hole M13 is illustrated in FIG. 10, two or more first oil holes M13 may be provided at different positions in the rotation direction of the input shaft 11D. In addition, the first oil hole M13 is provided on the upstream side of the first input shaft raceway surface K11 in the flow direction (oil flow direction) of the lubricating oil in the first oil passage M11 in the axial direction (extending direction) of the input shaft 11D.

In this case, in the input gear unit 10D, a supply path of the lubricating oil to the first input shaft raceway surface K11 and the like can be shortened, and the lubricating oil can be more appropriately supplied. It is noted that, at least a part of an opening part M13a of the first oil hole M13 on the outer peripheral surface of the input shaft 11D may face the inner peripheral surface 13b of the first input shaft outer ring 13. In this case, the lubricating oil can be more efficiently supplied around the first input shaft raceway surface K11.

[Fifth Modification of Input Gear Unit]

Figure 11:
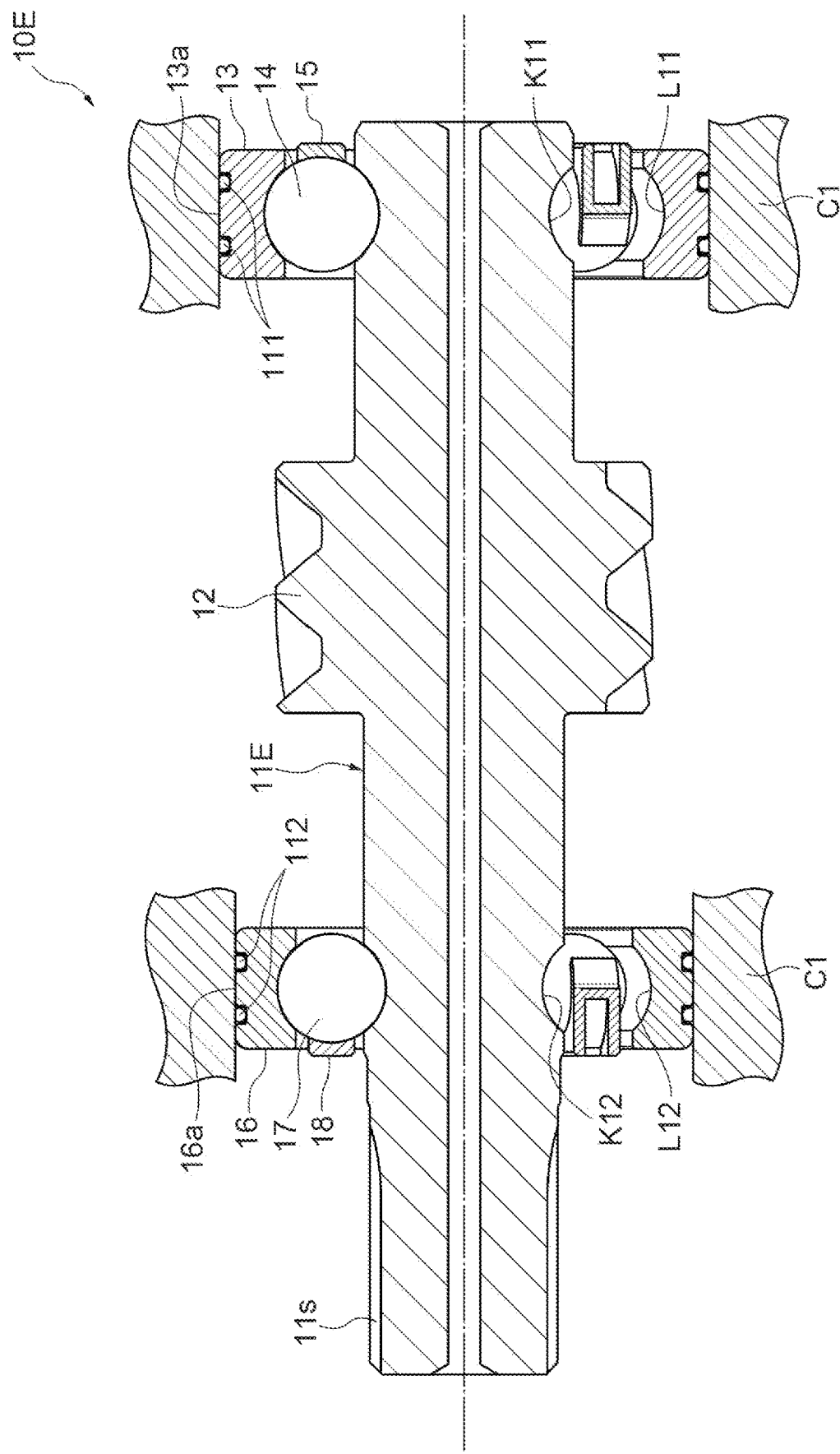
FIG. 11 is an enlarged cross-sectional view of an input gear unit according to a fifth modification.

As illustrated in FIG. 11, an input gear unit (first shaft unit) 10E according to a fifth modification is obtained by adding O-rings 111 and 112 to the input gear unit 10D according to the fourth modification illustrated in FIG. 10. More specifically, the input gear unit 10E includes an input shaft (first shaft) 11E instead of the input shaft 11D according to the fourth embodiment, and further includes the O-rings 111 and 112.

In the input shaft 11E, the first oil hole M13 is omitted from the input shaft 11D according to the fourth embodiment. The O-ring 111 is disposed so as to surround the first input shaft outer ring 13 between the outer peripheral surface 13a of the first input shaft outer ring 13 and the input shaft support part C1. In the present modification, two O-rings 111 are provided. The O-ring 112 is disposed so as to surround the second input shaft outer ring 16 between the outer peripheral surface 16a of the second input shaft outer ring 16 and the input shaft support part C1. In the present modification, two O-rings 112 are provided.

The O-rings 111 and 112 are made of an elastically deformable material (for example, rubber, resin, and the like). In the present modification, the O-ring 111 is disposed in a groove provided in the outer peripheral surface 13a of the first input shaft outer ring 13. Similarly, in the present modification, the O-ring 112 is disposed in a groove provided in the outer peripheral surface 16a of the second input shaft outer ring 16. In this case, in the input gear unit 10E, it is possible to prevent occurrence of creep due to the first input shaft outer ring 13 and the second input shaft outer ring 16 receiving a rotational load or whirling.

It is noted that, as another method of preventing the occurrence of creep, a coating may be applied to the outer peripheral surface of the first input shaft outer ring instead of the O-ring 111 provided on the outer peripheral surface 13a of the first input shaft outer ring 13. The surface of this coating has lower friction than that of the outer peripheral surface of the first input shaft outer ring. This coating may be, for example, a low-friction solid lubricating coating. This solid lubricating coating is a coating in which a solid lubricant is blended. Even when a low friction coating is applied, it is possible to prevent occurrence of creep due to the first input shaft outer ring receiving a rotational load or whirling. Similarly, the second input shaft outer ring 16 side provided with the O-ring 112 may be processed with a low friction coating.

[Modification of Counter Gear Unit]

Next, various modifications of the counter gear unit 20 will be described.

[First Modification of Counter Gear Unit]

Figure 12:
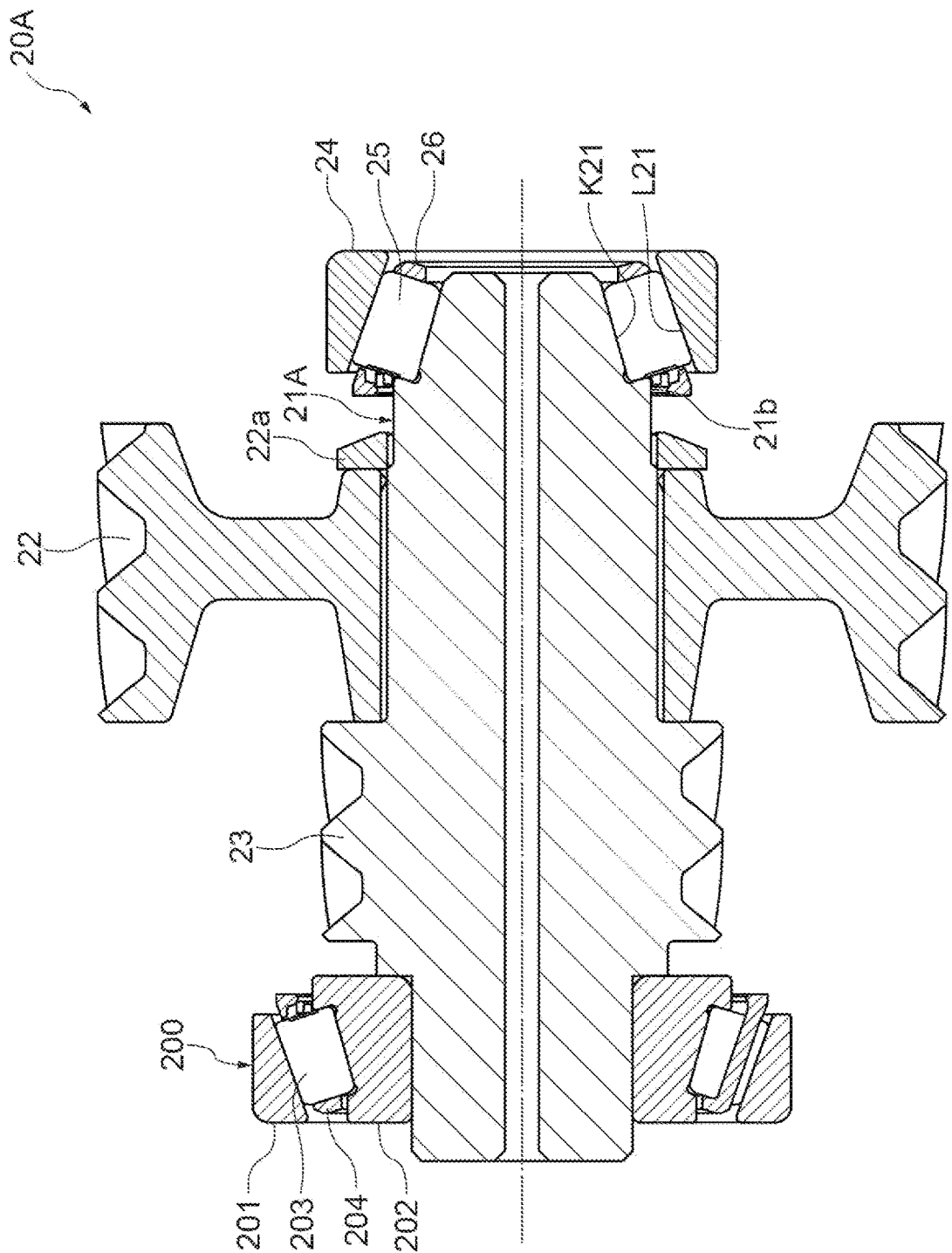
FIG. 12 is an enlarged cross-sectional view of a counter gear unit according to a first modification.

As illustrated in FIG. 12, a counter gear unit (second shaft unit) 20A according to a first modification is different from the counter gear unit 20 according to the embodiment in that only one side has a configuration in which a bearing and a counter shaft are formed to be integrated with each other. Further, on the side where the counter shaft and the bearing are formed to be integrated with each other, the counter shaft is not provided with a small flange part. More specifically, the counter gear unit 20A includes a counter shaft (second shaft) 21A, the counter shaft input gear 22, the counter shaft output gear 23, the first counter shaft outer ring 24, the rolling elements 25, the first counter shaft retainer 26, and a bearing 200.

The bearing 200 is a tapered roller bearing. The bearing 200 includes an outer ring 201, an inner ring 202, a plurality of rolling elements 203, and a retainer 204. The rolling elements 203 are tapered rollers. The rolling elements 203 are disposed between the outer ring raceway surface of the outer ring 201 and the inner ring raceway surface of the inner ring 202. The retainer 204 retains each of the plurality of rolling elements 203 in a freely rolling manner. The inner ring 202 is attached to an outer peripheral surface of the counter shaft 21A, in which the outer peripheral surface is in the vicinity of an end close to the counter shaft output gear 23. The outer peripheral surface of the outer ring 201 is attached to the counter shaft support part C2 described above.

Further, in the counter shaft 21A, an end opposite an end of the side to which the bearing 200 is attached is rotatably supported by the counter shaft support part C2 via the rolling elements 25 and the first counter shaft outer ring 24 described above. It is noted that, in the present modification, a small flange part is not provided at a position adjacent to the small diameter side end of the first counter shaft raceway surface (second shaft raceway surface) K21 having the truncated cone shape.

In such a case as well, at the portion of the counter shaft 21A where the first counter shaft raceway surface K21 is provided, the counter shaft 21A also functions as an inner ring. Therefore, the counter gear unit 20A can stably and rotatably support the counter shaft 21A. Further, in the counter shaft 21A, the small flange part is not provided at the end of the side on which the first counter shaft raceway surface K21 is provided. Therefore, in the counter gear unit 20A, it is possible to improve the assembly performance of each part.

[Second Modification of Counter Gear Unit]

Figure 13:
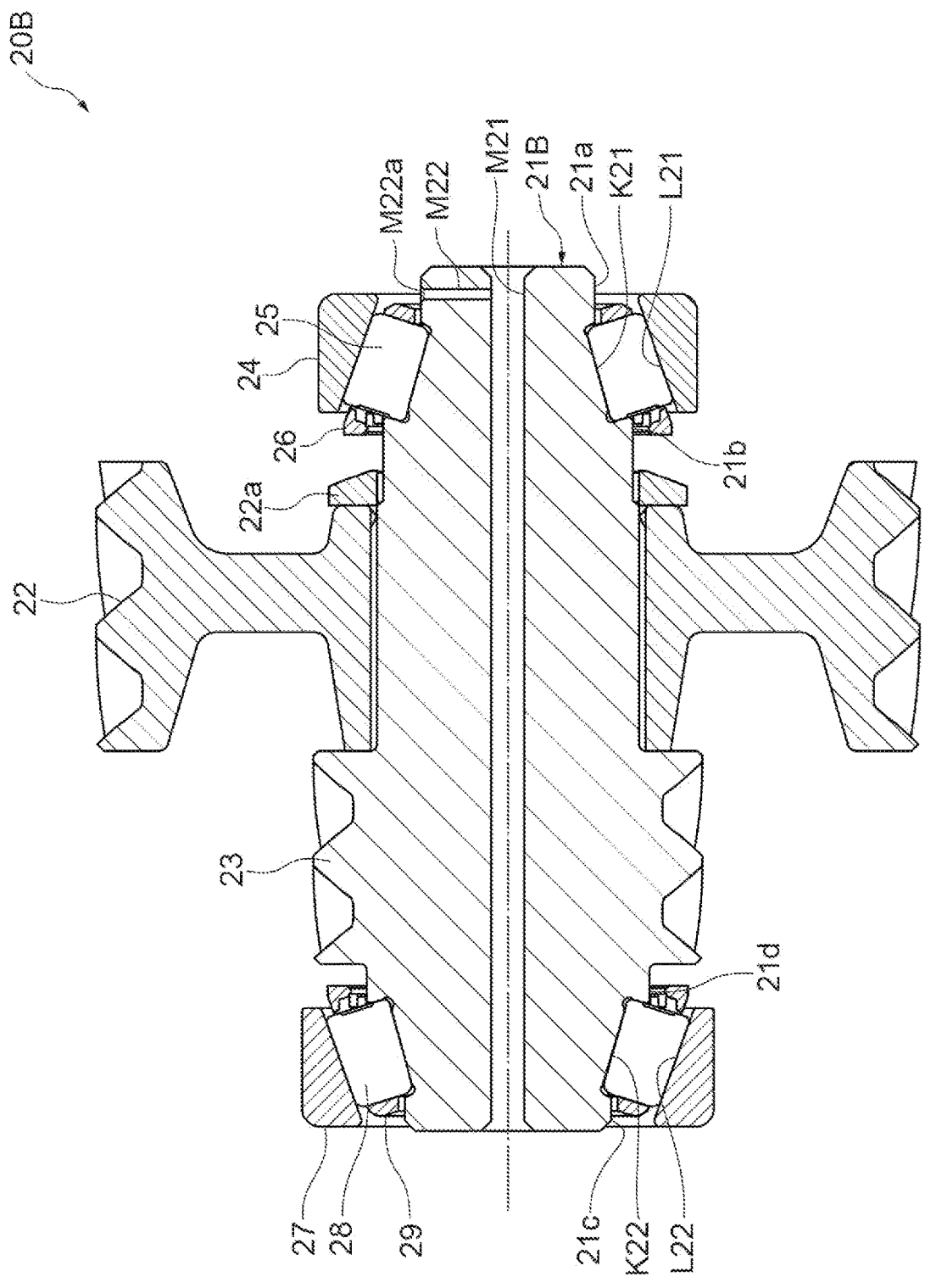
FIG. 13 is an enlarged cross-sectional view of a counter gear unit according to a second modification.

As illustrated in FIG. 13, a counter gear unit (second shaft unit) 20B according to a second modification includes a counter shaft (second shaft) 21B instead of the counter shaft 21 of the counter gear unit 20 according to the embodiment illustrated in FIG. 4.

A second oil passage M21 extending in the axial direction of the counter shaft 21B is provided in the counter shaft 21B. Lubricating oil is supplied to the second oil passage M21 from a hydraulic supply source (not illustrated). It is noted that, in the second oil passage M21 provided in the counter shaft 21B, the lubricating oil flows from an end of the side on which the first counter shaft raceway surface K21 is formed toward an end of the side on which the second counter shaft raceway surface K22 is formed. That is, in the second oil passage M21, the first counter shaft raceway surface K21 side is the upstream side in the flow direction of the lubricating oil, and the second counter shaft raceway surface K22 side is the downstream side in the flow direction of the lubricating oil.

Further, the counter shaft 21B is provided with a second oil hole M22 communicating with the second oil passage M21 and the outer peripheral surface of a first counter shaft small flange part (second small flange part) 21a provided in the counter shaft 21B. That is, the lubricating oil can be supplied around the rolling elements 25 from the second oil passage M21 through an opening part M22a of the second oil hole M22. It is noted that, although only one second oil hole M22 is illustrated in FIG. 13, two or more second oil holes M22 may be provided at different positions in the rotation direction of the counter shaft 21B. In addition, at least a part of the opening part M22a of the second oil hole M22 that opens to the first counter shaft small flange part 21a faces the first counter shaft outer ring raceway surface L21 of the first counter shaft outer ring 24 in the radial direction of the counter shaft 21B.

In this case, the counter gear unit 20B rotatably supports the counter shaft 21B by a structure of a tapered roller bearing. The counter gear unit 20B can supply the lubricating oil from the outer peripheral surface of the first counter shaft small flange part 21a to the first counter shaft raceway surface K21 and the like, and can more suitably supply the lubricating oil by a pump action of the tapered roller bearing.

As described above, at least a part of the opening part M22a of the second oil hole M22 faces the first counter shaft outer ring raceway surface L21 of the first counter shaft outer ring 24. As a result, in the counter gear unit 20B, it is possible to improve performance of supplying the lubricating oil to the first counter shaft raceway surface K21 and the like. It is noted that, in the counter gear unit 20B according to the second modification, an oil hole may be provided in the second counter shaft small flange part 21c on the rolling element 28 side to supply the lubricating oil. Alternatively, lubricating oil may be supplied to both the rolling elements 25 and 28.

[Third Modification of Counter Gear Unit]

Figure 14:
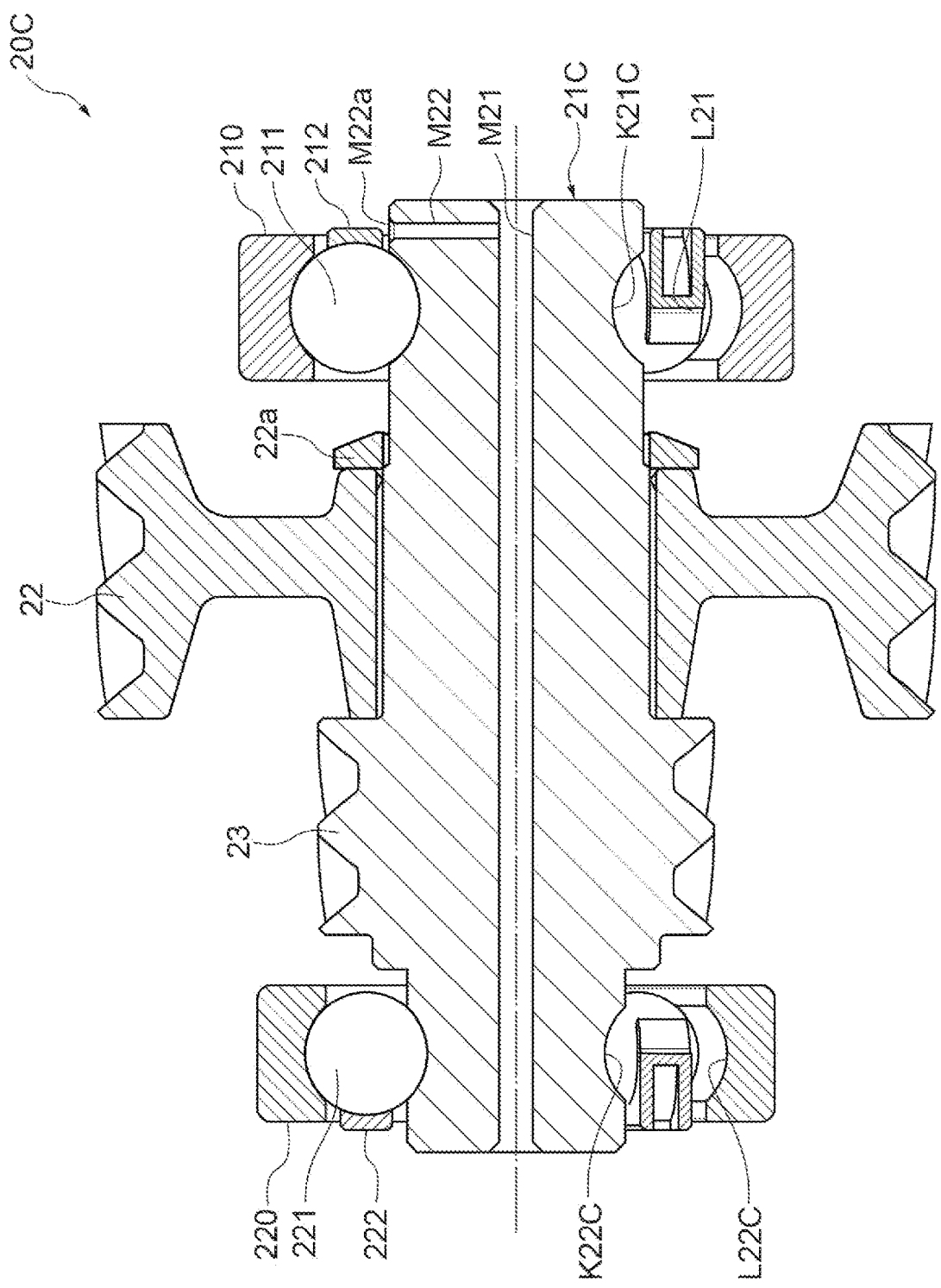
FIG. 14 is an enlarged cross-sectional view of a counter gear unit according to a third modification.

As illustrated in FIG. 14, a counter gear unit (second shaft unit) 20C according to a third modification rotatably supports a counter shaft (second shaft) 21C by a structure of a deep groove ball bearing. More specifically, the counter gear unit 20C includes the counter shaft 21C, the counter shaft input gear 22, the counter shaft output gear 23, a first counter shaft outer ring (second outer ring) 210, a plurality of rolling elements (second rolling elements) 211, a first counter shaft retainer 212, a second counter shaft outer ring (second outer ring) 220, a plurality of rolling elements (second rolling elements) 221, and a second counter shaft retainer 222.

Instead of the first counter shaft raceway surface K21 and the second counter shaft raceway surface K22 according to the embodiment, a first counter shaft raceway surface (second shaft raceway surface) K21C and a second counter shaft raceway surface (second shaft raceway surface) K22C are each provided on the outer peripheral surface of the counter shaft 21C. Each of the first counter shaft raceway surface K21C and the second counter shaft raceway surface K22C is a groove extending in the circumferential direction of the outer peripheral surface of the counter shaft 21C.

The first counter shaft outer ring 210 is disposed so as to surround the first counter shaft raceway surface K21C. The outer peripheral surface of the first counter shaft outer ring 210 is attached to the counter shaft support part C2 described above. A first counter shaft outer ring raceway surface (second outer ring raceway surface) L21C is provided on the inner peripheral surface of the first counter shaft outer ring 210. The first counter shaft outer ring raceway surface L21C is a groove extending in the circumferential direction of the first counter shaft outer ring 210. The rolling elements 211 are spherical balls. The rolling elements 211 are disposed between the first counter shaft raceway surface K21C of the counter shaft 21C and the first counter shaft outer ring raceway surface L21C of the first counter shaft outer ring 210. The first counter shaft retainer 212 retains each of the plurality of rolling elements 211 in a freely rolling manner. In this manner, the first counter shaft outer ring 210, the rolling elements 211, and the first counter shaft raceway surface K21C of the counter shaft 21C constitute a deep groove ball bearing.

Similarly, the second counter shaft outer ring 220 is disposed so as to surround the second counter shaft raceway surface K22C. The outer peripheral surface of the second counter shaft outer ring 220 is attached to the counter shaft support part C2 described above. A second counter shaft outer ring raceway surface (second outer ring raceway surface) L22C is provided on the inner peripheral surface of the second counter shaft outer ring 220. The second counter shaft outer ring raceway surface L22C is a groove extending in the circumferential direction of the second counter shaft outer ring 220. The rolling elements 221 are spherical balls. The rolling elements 221 are disposed between the second counter shaft raceway surface K22C of the counter shaft 21C and the second counter shaft outer ring raceway surface L22C of the second counter shaft outer ring 220. The second counter shaft retainer 222 retains each of the plurality of rolling elements 221 in a freely rolling manner. In this manner, the second counter shaft outer ring 220, the rolling elements 221, and the second counter shaft raceway surface K22C of the counter shaft 21C constitute a deep groove ball bearing.

Inside the counter shaft 21C, the second oil passage M21 extending in the axial direction of the counter shaft 21C is provided. Further, the counter shaft 21C is provided with the second oil hole M22 communicating with the second oil passage M21 and the outer peripheral surface of the counter shaft 21C. It is noted that, although only one second oil hole M22 is illustrated in FIG. 14, two or more second oil holes M22 may be provided at different positions in the rotation direction of the counter shaft 21C. The opening part M22a of the second oil hole M22 that opens to the outer peripheral surface of the counter shaft 21C is adjacent to the first counter shaft raceway surface K21C.

Here, the fact that the opening part M22a of the second oil hole M22 is adjacent to the first counter shaft raceway surface K21C includes a state in which an opening edge of the opening part M22a is in contact with the first counter shaft raceway surface K21C. The fact that the opening part M22a of the second oil hole M22 is adjacent to the first counter shaft raceway surface K21C includes a state in which the opening edge of the opening part M22a and the first counter shaft raceway surface K21C are adjacent to each other with a predetermined gap interposed therebetween. That is, the fact that the opening part M22a of the second oil hole M22 is adjacent to the first counter shaft raceway surface K21C may mean that the lubricating oil can be supplied from the opening part M22a of the second oil hole M22 to the periphery of the first counter shaft raceway surface K21C.

Since the counter gear unit 20C includes the second oil hole M22, the lubricating oil can be appropriately supplied to the first counter shaft raceway surface K21C and the like via the second oil hole M22. Further, in the present modification, the counter shaft 21C is supported by a configuration of a deep groove ball bearing. In this case, the counter shaft 21C can be rotated with a small amount of lubricating oil as compared with a case in which the counter shaft is supported by a configuration of a tapered roller bearing.

Furthermore, at least a part of the opening part M22a of the second oil hole M22 may face the inner peripheral surface of the first counter shaft outer ring 210 in the radial direction of the counter shaft 21C. In this case, the counter gear unit 20C can improve performance of supplying the lubricating oil to the first counter shaft raceway surface K21C and the like.

[Modification of Differential Gear Unit]

Next, various modifications of the differential gear unit will be described.

[First Modification of Differential Gear Unit]

Figure 15:
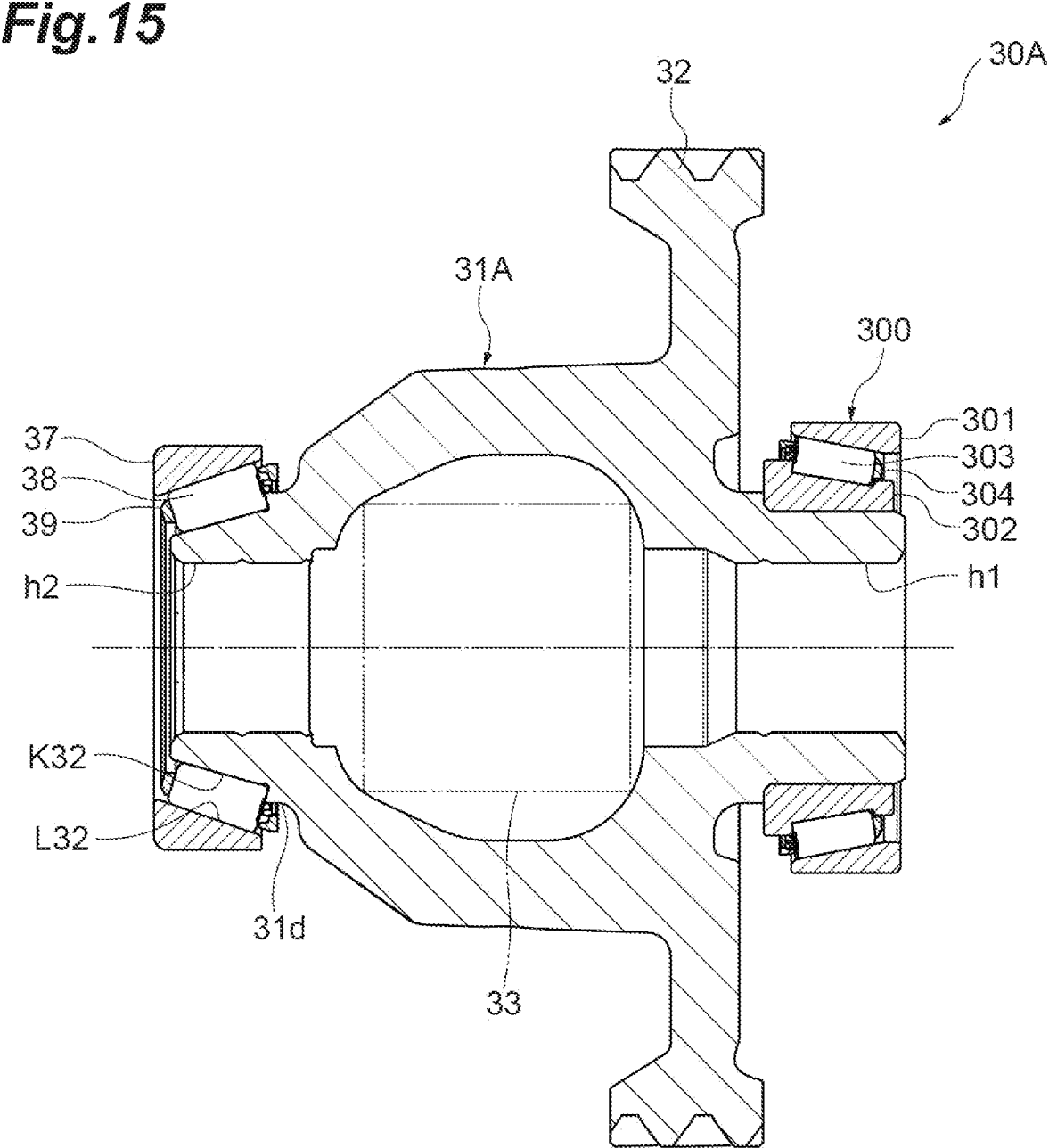
FIG. 15 is an enlarged cross-sectional view of a differential gear unit according to a first modification.

As illustrated in FIG. 15, a differential gear unit 30A according to a first modification is different from the differential gear unit 30 according to the embodiment in that only one side has a configuration in which the bearing and the differential case are formed to be integrated with each other. In addition, the small flange part is not provided in the differential case even on the side where the differential case and the bearing are formed to be integrated with each other. More specifically, the differential gear unit 30A includes a differential case 31A, the differential input gear 32, the differential mechanism 33, the second differential outer ring 37, the rolling elements 38, the second differential retainer 39, and a bearing 300.

The bearing 300 is a tapered roller bearing. The bearing 300 includes an outer ring 301, an inner ring 302, a plurality of rolling elements 303, and a retainer 304. The rolling elements 303 are tapered rollers. The rolling elements 303 are disposed between the outer ring raceway surface of the outer ring 301 and the inner ring raceway surface of the inner ring 302. The retainer 304 retains each of the plurality of rolling elements 303 in a freely rolling manner. The inner ring 302 is attached to the outer peripheral surface of an end (end of the side on which the first insertion port h1 is provided) opposite the side on which the second differential raceway surface K32 is provided in the differential case 31A. The outer peripheral surface of the outer ring 301 is attached to the differential support part C3 described above.

Further, in the differential case 31A, an end opposite an end of the side to which the bearing 300 is attached is rotatably supported by the differential support part C3 via the rolling elements 38 and the second differential outer ring 37 described above. It is noted that, in the present modification, the small flange part is not provided at a position adjacent to the small diameter side end of the second differential raceway surface (third shaft raceway surface) K32 having the truncated cone shape.

In such a case as well, the differential case 31A also functions as an inner ring at a portion where the second differential raceway surface K32 is provided in the differential case 31A. Therefore, the differential gear unit 30A can stably and rotatably support the differential case 31A. Further, in the differential case 31A, a small flange part is not provided at an end of the side on which the second differential raceway surface K32 is provided. Therefore, in the differential gear unit 30A, assembly performance of each part can be improved.

[Second Modification of Differential Gear Unit]

Figure 16:
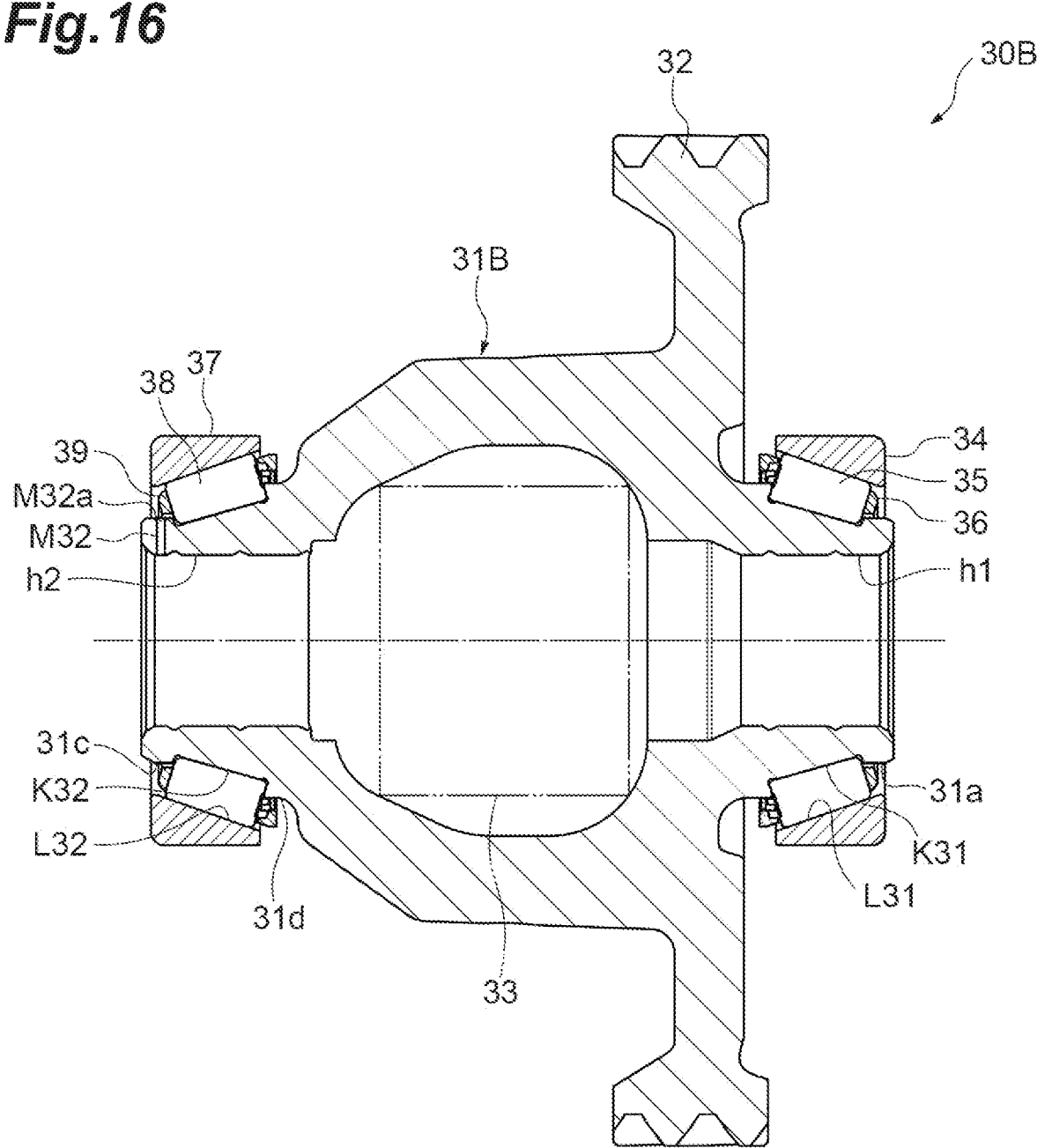
FIG. 16 is an enlarged cross-sectional view of a differential gear unit according to a second modification.

As illustrated in FIG. 16, a differential gear unit 30B according to a second modification includes a differential case 31B instead of the differential case 31 of the differential gear unit 30 according to the embodiment illustrated in FIG. 5.

The differential case 31B is provided with a third oil hole M32 communicating with the outer peripheral surface of the second differential small flange part (third small flange part) 31c adjacent to the first differential raceway surface K31 and the second insertion port h2. It is noted that, although only one third oil hole M32 is illustrated in FIG. 16, two or more third oil holes M32 may be provided at different positions in the rotation direction of the differential case 31B. At least a part of the opening part M32a of the third oil hole M32 that opens to the outer peripheral surface of the second differential small flange part 31c faces the second differential outer ring raceway surface L32 of the second differential outer ring 37 in the radial direction of the second differential outer ring 37.

Here, lubricating oil flows through an accommodation space in which the differential mechanism 33 is accommodated in the differential case 31B. Lubricating oil also enters an inner portion of the second insertion port h2. That is, the second insertion port h2 (gap between the inner wall surface of the second insertion port h2 and the outer peripheral surface of the drive shaft inserted into the second insertion port h2) functions as an oil passage (third oil passage) for lubricating oil. Then, lubricating oil is supplied from the second insertion port h2 functioning as an oil passage to the vicinity of the first counter shaft raceway surface K21 via the third oil hole M32.

In this case, the differential gear unit 30B rotatably supports the differential case 31B by a structure of a tapered roller bearing. Further, the differential gear unit 30B can supply the lubricating oil from the outer peripheral surface of the second differential small flange part 31c to the first differential raceway surface K31 and the like, and can more suitably supply the lubricating oil by a pump action of the tapered roller bearing.

As described above, at least a part of the opening part M32a of the third oil hole M32 faces the second differential outer ring raceway surface L32 of the second differential outer ring 37. As a result, in the differential gear unit 30B, it is possible to improve performance of supplying the lubricating oil to the second differential outer ring raceway surface L32 and the like. It is noted that, in the differential gear unit 30B according to the second modification, an oil hole may be provided in the first differential small flange part 31a on the rolling element 35 side to supply the lubricating oil. Alternatively, lubricating oil may be supplied to both the rolling elements 35 and 38 sides.

[Modification of Drive Unit]

Next, various modifications of the drive unit will be described.

[First Modification of Drive Unit]

Figure 17:
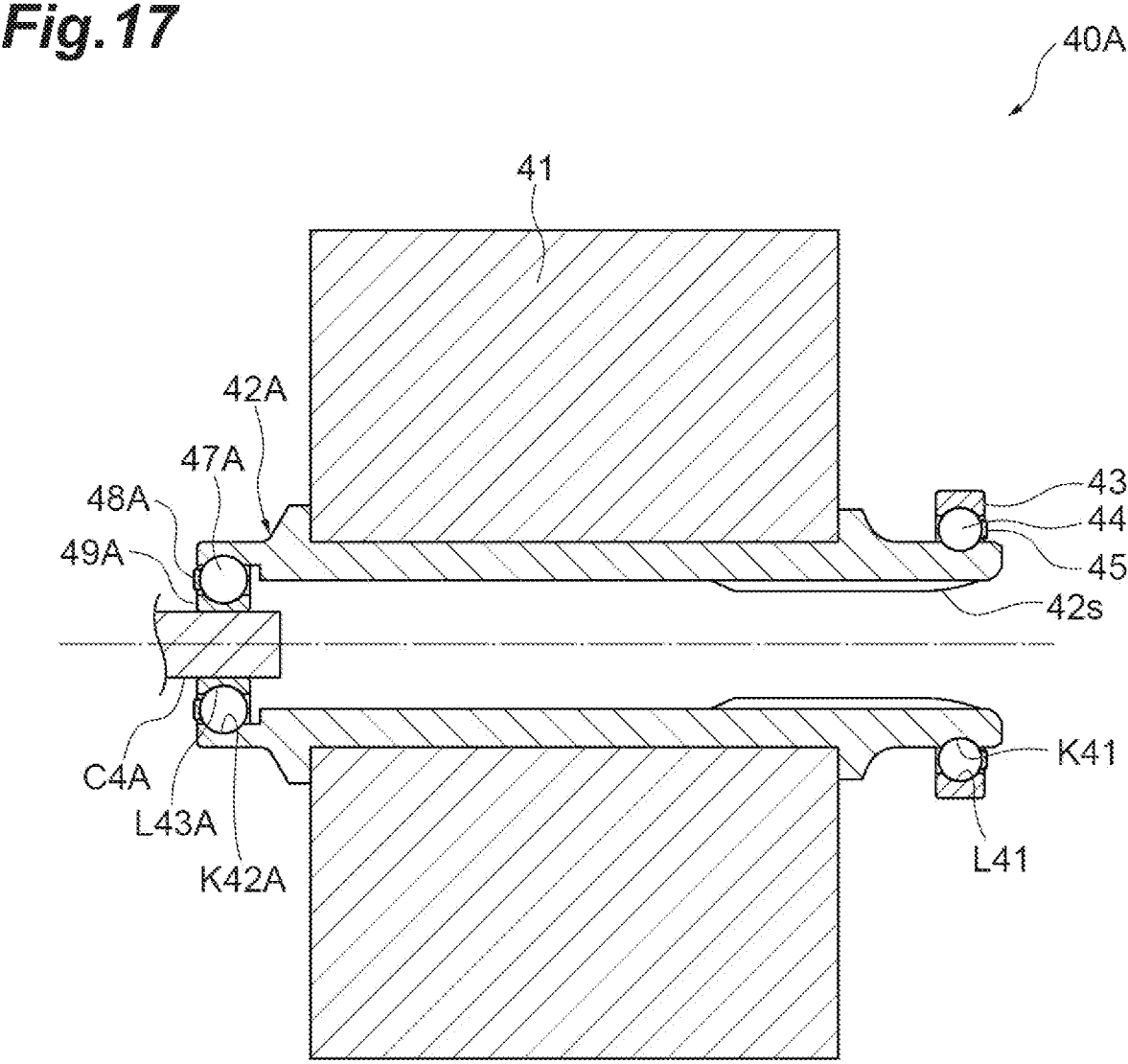
FIG. 17 is an enlarged cross-sectional view of a drive unit according to a first modification.

As illustrated in FIG. 17, a drive unit 40A according to a first modification is different from the drive unit 40 according to the embodiment in that one end of a rotor shaft is supported from the inner peripheral side. More specifically, the drive unit 40A includes the motor rotor 41, a rotor shaft (drive shaft) 42A, the first rotor shaft outer ring 43, the rolling element 44, the first rotor shaft retainer 45, a plurality of rolling elements 47A, a second rotor shaft retainer 48A, and a second rotor shaft inner ring 49A.

The rotor shaft 42A is connected to the input shaft 11, similarly to 42 according to the embodiment. Further, the rotor shaft 42A has a first rotor shaft raceway surface K41 and a second rotor shaft raceway surface (fourth shaft raceway surface) K42A. The second rotor shaft raceway surface K42A is provided on the inner peripheral surface of the rotor shaft 42 in the vicinity of an end opposite the first rotor shaft raceway surface K41. The second rotor shaft raceway surface K42A is a groove extending in the circumferential direction of the inner peripheral surface of the rotor shaft 42A.

The second rotor shaft inner ring 49A is attached to the outer periphery of a rotor shaft support part (fourth support part) C4A that supports the rotor shaft 42A from the inside of the second rotor shaft raceway surface K42A. The second rotor shaft inner ring 49A is provided inside the second rotor shaft raceway surface K42A such that the outer peripheral surface of the second rotor shaft inner ring 49A faces the second rotor shaft raceway surface K42A. The second rotor shaft inner ring 49A has a second rotor shaft inner ring raceway surface (fourth inner ring raceway surface) L43A on the outer peripheral surface thereof. The second rotor shaft inner ring raceway surface L43A is a groove extending in the circumferential direction of the inner peripheral surface of the second rotor shaft inner ring 49A.

The plurality of rolling elements 47A are disposed between the second rotor shaft raceway surface K42A of the rotor shaft 42A and the second rotor shaft inner ring raceway surface L43A of the second rotor shaft inner ring 49A. Each of the rolling elements 47A is a ball having a spherical shape. The second rotor shaft retainer 48A retains, in a freely rolling manner, each of the plurality of rolling elements 47A between the inner peripheral surface of the rotor shaft 42A and the inner peripheral surface of the second rotor shaft inner ring 49A.

In this manner, the rotor shaft 42A is rotatably supported at two portions including a portion of the first rotor shaft raceway surface K41 and a portion of the second rotor shaft raceway surface K42A. In addition, the drive unit 40A in the present modification does not have a component that functions only as an outer ring of a bearing at the end of the side on which the second rotor shaft raceway surface K42A is provided. At the end of the side on which the second rotor shaft raceway surface K42A is provided in the rotor shaft 42A of the present modification, the rotor shaft 42A also functions as an outer ring of a bearing.

In addition, in the drive unit 40A of the present modification, the first rotor shaft outer ring 43, the plurality of rolling elements 44, and the first rotor shaft raceway surface K41 of the rotor shaft 42 constitute a deep groove ball bearing. Similarly, the second rotor shaft inner ring 49A, the rolling element 47A, and the second rotor shaft raceway surface K42A of the rotor shaft 42A constitute a deep groove ball bearing.

As described above, in the present modification, one end of the rotor shaft 42A is rotatably supported by the above-described rotor shaft support part C4 via the rolling element 44 and the first rotor shaft outer ring 43. That is, one end of the rotor shaft 42A also functions as an outer ring of a bearing. The other end of the rotor shaft 42A is rotatably supported by the rotor shaft support part C4A via the rolling element 47A and the second rotor shaft inner ring 49A. The other end of the rotor shaft 42A also functions as an outer ring of a bearing. Accordingly, the drive unit 40A can reduce the number of components of a mechanism that supports the rotor shaft 42A, and can prevent deterioration in support accuracy of the rotor shaft 42A due to variations in component accuracy and the like. Therefore, the drive unit 40 can stably and rotatably support the rotor shaft 42A.

In addition, since the rolling element 47A, the second rotor shaft inner ring 49A, and the like are located inside the rotor shaft 42A, space saving and torque reduction can be achieved while maintaining assemble performance when the motor rotor 41 and the like are assembled with the rotor shaft 42A.

[Second Modification of Drive Unit]

Figure 18:
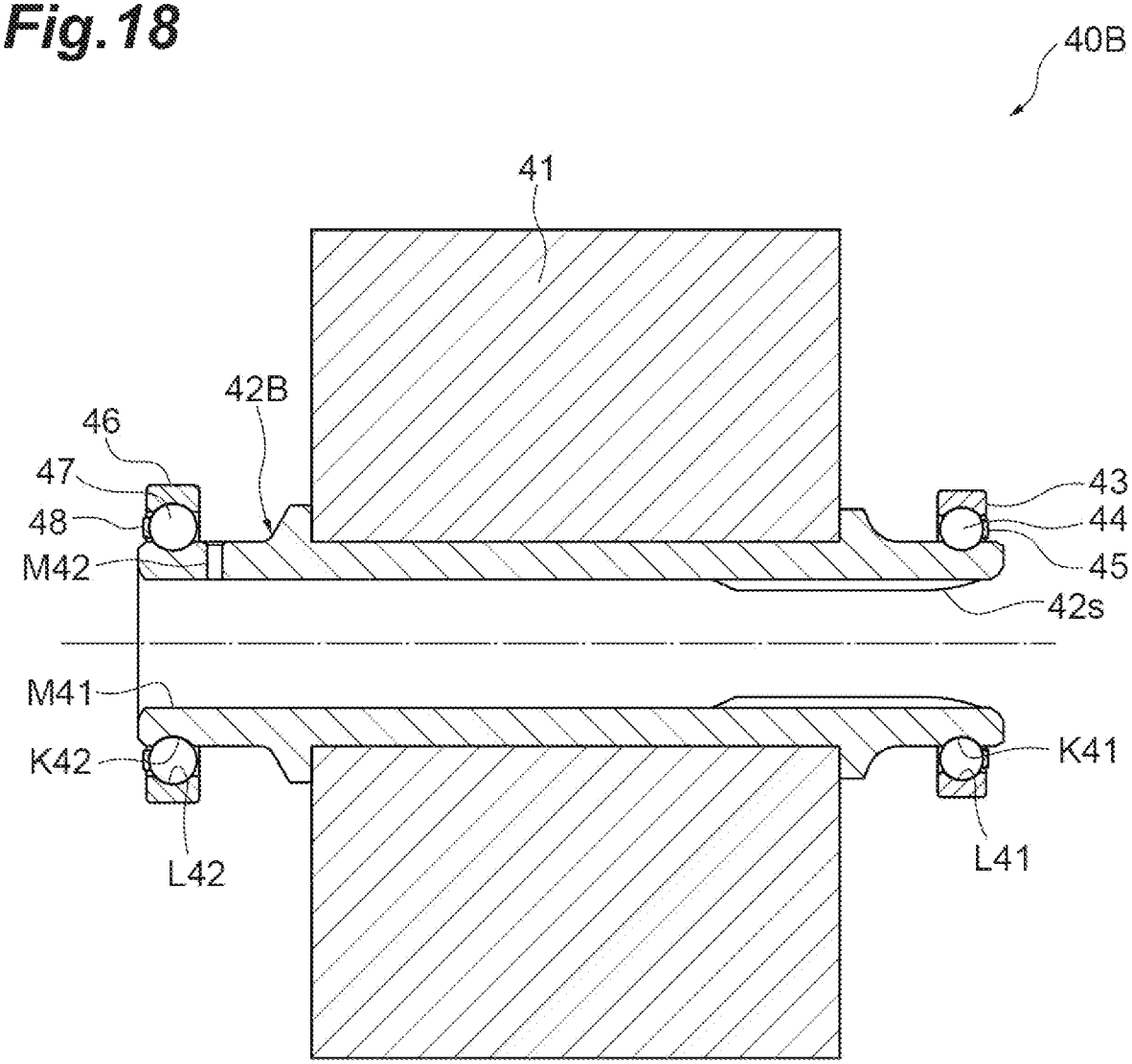
FIG. 18 is an enlarged cross-sectional view of a drive unit according to a second modification.

As illustrated in FIG. 18, a drive unit 40B according to a second modification includes a rotor shaft (drive shaft) 42B instead of the rotor shaft 42 of the drive unit 40 according to the embodiment illustrated in FIG. 6.

A fourth oil passage M41 extending in the axial direction of the rotor shaft 42B is provided inside the rotor shaft 42B. Lubricating oil is supplied to the fourth oil passage M41 from a hydraulic supply source (not illustrated). Further, the rotor shaft 42B is provided with a fourth oil hole M42 communicating with the fourth oil passage M41 and the outer peripheral surface of the rotor shaft 42B. It is noted that, although only one fourth oil hole M42 is illustrated in FIG. 18, two or more fourth oil holes M42 may be provided at different positions in the rotation direction of the rotor shaft 42B. An opening part M42a of the fourth oil hole M42, which opens to the outer peripheral surface of the rotor shaft 42B, is adjacent to a second rotor shaft raceway surface (fourth shaft raceway surface) K42. That is, oil can be supplied around the rolling element 47 from the fourth oil passage M41 through the opening part M42a of the fourth oil hole M42.

Here, the fact that the opening part M42*a* of the fourth oil hole M42 is adjacent to the second rotor shaft raceway surface K42 includes a state in which an opening edge of the opening part M42*a* is in contact with the second rotor shaft raceway surface K42. The fact that the opening part M42*a* of the fourth oil hole M42 is adjacent to the second rotor shaft raceway surface K42 includes a state in which the opening edge of the opening part M42*a* and the second rotor shaft raceway surface K42 are adjacent to each other with a predetermined gap interposed therebetween. That is, the fact that the opening part M42*a* of the fourth oil hole M42 is adjacent to the second rotor shaft raceway surface K42 means that the lubricating oil can be supplied from the opening part M42*a* of the fourth oil hole M42 to the periphery of the second rotor shaft raceway surface K42.

Since the drive unit 40B includes the fourth oil hole M42, it is possible to appropriately supply the lubricating oil to the second rotor shaft raceway surface K42 and the like via the fourth oil hole M42. It is noted that, in the drive unit 40B according to the second modification, an oil hole similar to the fourth oil hole M42 may be provided in the rolling element 44 side to supply lubricating oil. Alternatively, lubricating oil may be supplied to both the rolling elements 47 and 44 sides.

Although the embodiments of the present disclosure have been described above, the present disclosure is not limited to the above-described embodiments, and various modifications can be made without departing from the gist of the present disclosure. In addition, at least some of the embodiments and various modifications described above may be freely and selectively combined with each other.

In the above-described embodiment and various modifications, all of the input gear unit 10 (10A, 10B, 10C, 10D, 10E), the counter gear unit 20 (20A, 20B, 20C), the differential gear unit 30 (30A, 30B), and the drive unit 40 (40A, 40B) have a configuration in which the rotating member such as the input shaft 11 and the bearing are formed to be integrated with each other. However, at least one of these units may have a configuration in which the rotating member and the bearing are formed to be integrated with each other. In addition, the speed reducer 1 according to the above-described embodiment and various modifications may further include a gear unit including a rotation shaft in addition to the above-described respective units.

In the above-described embodiment and various modifications, the deep groove ball bearing and the tapered roller bearing have been described as examples of the structure of the bearing. However, for example, a structure of another bearing such as an angular ball bearing or a cylindrical roller bearing may be used.

In the above description, the speed reducer has been used as the transmission according to the present disclosure. The transmission according to the present disclosure is not limited thereto, and may be a speed increasing machine that increases the rotational speed of the drive unit. Even when the transmission according to the present disclosure is the speed increasing machine, it is possible to adopt a configuration similar to the configuration of the bearing portion described in the speed reducer 1 except that a conversion ratio of the rotational speed by a gear between the units is different from that of the speed reducer 1 described above.

REFERENCE SIGNS LIST

1: SPEED REDUCER (TRANSMISSION), 10, 10A, 10B, 10C, 10D, 10E: INPUT GEAR UNIT (FIRST SHAFT UNIT), 11, 11A, 11B, 11C, 11D, 11E: INPUT SHAFT (FIRST SHAFT), 11*a*: FIRST RACEWAY SURFACE FORMING PART (RACEWAY SURFACE FORMING PART), 11*b*: FIRST INTERMEDIATE PART (INTERMEDIATE PART), 11*c*: SECOND RACEWAY SURFACE FORMING PART (RACEWAY SURFACE FORMING PART), 11*d*: SECOND INTERMEDIATE PART (INTERMEDIATE PART), 12: INPUT SHAFT OUTPUT GEAR (FIRST OUTPUT GEAR), 13: FIRST INPUT SHAFT OUTER RING (FIRST OUTER RING), 14, 17: ROLLING ELEMENT (FIRST ROLLING ELEMENT), 15: FIRST INPUT SHAFT RETAINER (RETAINER) 16: SECOND INPUT SHAFT OUTER RING (FIRST OUTER RING), 18: SECOND INPUT SHAFT RETAINER (RETAINER), 20, 20A, 20B, 20C: COUNTER GEAR UNIT (SECOND SHAFT UNIT), 21, 21A, 21B, 21C: COUNTER SHAFT (SECOND SHAFT), 21*a*: FIRST COUNTER SHAFT SMALL FLANGE PART (SECOND SMALL FLANGE PART), 22: COUNTER SHAFT INPUT GEAR (SECOND INPUT GEAR), 23: COUNTER SHAFT OUTPUT GEAR (SECOND OUTPUT GEAR), 24, 210: FIRST COUNTER SHAFT OUTER RING (SECOND OUTER RING), 27, 220: SECOND COUNTER SHAFT OUTER RING (SECOND OUTER RING), 25, 28, 211, 221: ROLLING ELEMENT (SECOND ROLLING ELEMENT), 30, 30A, 30B: DIFFERENTIAL GEAR UNIT, 31, 31A, 31B: DIFFERENTIAL CASE, 32: DIFFERENTIAL INPUT GEAR (THIRD INPUT GEAR), 33: DIFFERENTIAL MECHANISM, 34: FIRST DIFFERENTIAL OUTER RING (THIRD OUTER RING), 35, 38: ROLLING ELEMENT (THIRD ROLLING ELEMENT), 37: SECOND DIFFERENTIAL OUTER RING (THIRD OUTER RING), 40, 40A, 40B: DRIVE UNIT, 41: MOTOR ROTOR (DRIVE MECHANISM), 42, 42A, 42B: ROTOR SHAFT (DRIVE SHAFT), 43: FIRST ROTOR SHAFT OUTER RING (FOURTH OUTER RING), 44, 47, 47A: ROLLING ELEMENT (FOURTH ROLLING ELEMENT), 46: SECOND ROTOR SHAFT OUTER RING (FOURTH OUTER RING), 111, 112: O-RING, A1, A2, A3, A4: ROTATION AXIS, C1: INPUT SHAFT SUPPORT PART (FIRST SUPPORT PART), C2: COUNTER SHAFT SUPPORT PART (SECOND SUPPORT PART), C3: DIFFERENTIAL SUPPORT PART (THIRD SUPPORT PART), C4, C4A: ROTOR SHAFT SUPPORT PART (FOURTH SUPPORT PART), F11*a*, F11*b*, F12*a*, F12*b*: GROOVE EDGE PART, h2: SECOND INSERTION PORT (THIRD OIL PASSAGE), K11, K11B: FIRST INPUT SHAFT RACEWAY SURFACE (FIRST SHAFT RACEWAY SURFACE), K12, K12B: SECOND INPUT SHAFT RACEWAY SURFACE (FIRST SHAFT RACEWAY SURFACE), K21, K21C: FIRST COUNTER SHAFT RACEWAY SURFACE (SECOND SHAFT RACEWAY SURFACE), K22, K22C: SECOND COUNTER SHAFT RACEWAY SURFACE (SECOND SHAFT RACEWAY SURFACE), K31: FIRST DIFFERENTIAL RACEWAY SURFACE (THIRD SHAFT RACEWAY SURFACE), K32: SECOND DIFFERENTIAL RACEWAY SURFACE (THIRD SHAFT RACEWAY SURFACE), K41: FIRST ROTOR SHAFT RACEWAY SURFACE (FOURTH SHAFT RACEWAY SURFACE), K42, K42A: SECOND ROTOR SHAFT RACEWAY SURFACE (FOURTH SHAFT RACEWAY SURFACE), L11: FIRST INPUT SHAFT OUTER RING RACE-

WAY SURFACE (FIRST OUTER RING RACEWAY SURFACE), L12: SECOND INPUT SHAFT OUTER RING RACEWAY SURFACE (FIRST OUTER RING RACEWAY SURFACE), L21, L21C: FIRST COUNTER SHAFT OUTER RING RACEWAY SURFACE (SECOND OUTER RING RACEWAY SURFACE), L22, L22C: SECOND COUNTER SHAFT OUTER RING RACEWAY SURFACE (SECOND OUTER RING RACEWAY SURFACE), L31: FIRST DIFFERENTIAL OUTER RING RACEWAY SURFACE (THIRD OUTER RING RACEWAY SURFACE), L32: SECOND DIFFERENTIAL OUTER RING RACEWAY SURFACE (THIRD OUTER RING RACEWAY SURFACE), L41: FIRST ROTOR SHAFT OUTER RING RACEWAY SURFACE (FOURTH OUTER RING RACEWAY SURFACE), L42: SECOND ROTOR SHAFT OUTER RING RACEWAY SURFACE (FOURTH OUTER RING RACEWAY SURFACE), L43A: SECOND ROTOR SHAFT INNER RING RACEWAY SURFACE (FOURTH INNER RING RACEWAY SURFACE), M11: FIRST OIL PASSAGE, M12, M13: FIRST OIL HOLE, M12a, M13a, M22a, M32a, M42a: OPENING PART, M21: SECOND OIL, PASSAGE, M22: SECOND OIL HOLE, M32: THIRD OIL HOLE, M41: FOURTH OIL PASSAGE, M42: FOURTH OIL HOLE, S1, S2: RACEWAY GROOVE VIRTUAL CIRCLE

The invention claimed is:

1. A transmission comprising a first shaft unit connected to a drive shaft of a drive unit,
wherein the first shaft unit includes:
a first shaft connected to the drive shaft, the first shaft including a first shaft raceway surface that is formed by a groove extending in a circumferential direction on an outer peripheral surface of the first shaft;
a first output gear provided on the first shaft and configured to rotate integrally with the first shaft;
a first outer ring attached to a first support part supporting the first shaft and provided so as to surround the first shaft raceway surface, the first outer ring including a first outer ring raceway surface on an inner peripheral surface thereof; and
a plurality of ball-shaped first rolling elements disposed between the first shaft raceway surface and the first outer ring raceway surface,
wherein the groove forming the first shaft raceway surface has a pair of groove edge parts extending in the circumferential direction of the outer peripheral surface of the first shaft,
wherein the groove edge part on a side closer to the first output gear has a diameter larger than a diameter of the other groove edge part,
wherein the first rolling elements, the first shaft raceway surface, and the first outer ring raceway surface constitute a deep groove ball bearing, and
wherein a load point between the first rolling element and the first shaft raceway surface and a load point between the first rolling element and the first outer ring raceway surface are positioned on a line perpendicular to the first shaft.

2. The transmission according to claim 1, wherein the first shaft includes a raceway surface forming part that is a portion at which the first shaft raceway surface is provided, and an intermediate part that is a portion between the raceway surface forming part and the first output gear, and
the intermediate part has an outer diameter larger than an outer diameter of the raceway surface forming part.

3. The transmission according to claim 2, wherein a shape of the groove of the first shaft raceway surface in an axial direction of the first shaft is an arc shape along a raceway groove virtual circle, and
the intermediate part and the first output gear do not interfere with the raceway groove virtual circle.

4. The transmission according to claim 2, wherein a gap having a predetermined reference length is provided between the first outer ring and the intermediate part in an axial direction of the first shaft.

5. The transmission according to claim 1, further comprising a retainer configured to retain each of the plurality of rolling elements in a freely rolling manner,
wherein the retainer protrudes outwards from an end of the first outer ring in an axial direction of the first shaft.

6. The transmission according to claim 1, wherein an O-ring disposed so as to surround the first outer ring is provided between an outer peripheral surface of the first outer ring and the first support part.

7. The transmission according to claim 1, wherein an outer peripheral surface of the first outer ring is provided with a coating having friction lower than friction of the outer peripheral surface of the first outer ring.

8. The transmission according to claim 1, further comprising a second shaft unit to which power is transmitted from the first shaft unit,
wherein the second shaft unit includes:
a second shaft including a second shaft raceway surface on an outer peripheral surface thereof;
a second input gear provided on the second shaft, wherein the second input gear meshes with the first output gear and is configured to rotate integrally with the second shaft;
a second output gear provided on the second shaft and configured to rotate integrally with the second shaft;
a second outer ring attached to a second support part supporting the second shaft and provided so as to surround the second shaft raceway surface, the second outer ring including a second outer ring raceway surface on an inner peripheral surface thereof; and
a plurality of second rolling elements disposed between the second shaft raceway surface and the second outer ring raceway surface, and
wherein a rotation axis of the first shaft and a rotation axis of the second shaft are parallel to each other.

9. The transmission according to claim 8, wherein at least one of a number of teeth of the first output gear, a number of the first rolling elements, a number of teeth of the second input gear, a number of teeth of the second output gear, and a number of the second rolling elements is a prime number.

10. The transmission according to claim 8, wherein
each of the second rolling elements is a tapered roller,
the second shaft raceway surface has a truncated cone shape, and
the second shaft is not provided with a small flange part adjacent to a small diameter side end of the second shaft raceway surface having the truncated cone shape.

11. The transmission according to claim 8, further comprising a differential gear unit to which power is transmitted from the second shaft unit,
wherein the differential gear unit includes:
a differential case including a third shaft raceway surface on an outer peripheral surface thereof;

a third input gear provided on the differential case, wherein the third input gear meshes with the second output gear and is configured to rotate integrally with the differential case;

a differential mechanism provided in the differential case;

a third outer ring attached to a third support part supporting the differential case and provided so as to surround the third shaft raceway surface, the third outer ring including a third outer ring raceway surface on an inner peripheral surface thereof; and a plurality of third rolling elements disposed between the third shaft raceway surface and the third outer ring raceway surface, and wherein the rotation axis of the second shaft and a rotation axis of the differential case are parallel to each other.

12. The transmission according to claim 11, wherein each of the third rolling elements is a tapered roller, the third shaft raceway surface has a truncated cone shape, and the differential case is not provided with a small flange part adjacent to a small diameter side end of the third shaft raceway surface having the truncated cone shape.

13. The transmission according to claim 11, wherein at least one of a number of teeth of the first output gear, a number of the first rolling elements, a number of teeth of the second input gear, a number of teeth of the second output gear, a number of the second rolling elements, a number of teeth of the third input gear, and a number of the third rolling elements is a prime number.

14. The transmission according to claim 1, further comprising the drive unit, wherein the drive unit includes:
a drive mechanism;
the drive shaft including a fourth shaft raceway surface on an outer peripheral surface thereof, wherein the drive shaft is rotationally driven by the drive mechanism and is connected to the first shaft;

a fourth outer ring attached to a fourth support part supporting the drive shaft and provided so as to surround the fourth shaft raceway surface, the fourth outer ring including a fourth outer ring raceway surface on an inner peripheral surface thereof; and a plurality of fourth rolling elements disposed between the fourth shaft raceway surface and the fourth outer ring raceway surface.

15. The transmission according to claim 14, wherein at least one of a number of teeth of the first output gear, a number of the first rolling elements, and a number of the fourth rolling elements is a prime number.

16. The transmission according to claim 1, further comprising the drive unit, wherein the drive unit includes:
a drive mechanism;
the drive shaft including a fourth shaft raceway surface on an inner peripheral surface thereof, wherein the drive shaft is rotationally driven by the drive mechanism and is connected to the first shaft;

a fourth inner ring attached to an outer periphery of a fourth support part supporting the drive shaft from an inside of the fourth shaft raceway surface and provided in the inside of the fourth shaft raceway surface, the fourth inner ring including a fourth inner ring raceway surface on an outer peripheral surface thereof; and a plurality of fourth rolling elements disposed between the fourth shaft raceway surface and the fourth inner ring raceway surface.

17. The transmission according to claim 1, wherein at least one of a number of teeth of the first output gear and a number of the first rolling elements is a prime number.

* * * * *